United States Patent
Homma et al.

(10) Patent No.: US 10,714,968 B2
(45) Date of Patent: Jul. 14, 2020

(54) POWER CONTROL APPARATUS, POWER CONTROL SYSTEM, AND POWER CONTROL METHOD

(71) Applicant: NEC Corporation, Tokyo (JP)

(72) Inventors: Kosuke Homma, Tokyo (JP); Koji Kudo, Tokyo (JP); Ryo Hashimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 31 days.

(21) Appl. No.: 16/082,311

(22) PCT Filed: Mar. 8, 2016

(86) PCT No.: PCT/JP2016/057227
§ 371 (c)(1),
(2) Date: Sep. 5, 2018

(87) PCT Pub. No.: WO2017/154116
PCT Pub. Date: Sep. 14, 2017

(65) Prior Publication Data
US 2019/0074709 A1      Mar. 7, 2019

(51) Int. Cl.
*H02J 7/34*     (2006.01)
*H02J 3/38*     (2006.01)
(Continued)

(52) U.S. Cl.
CPC ............. *H02J 7/34* (2013.01); *G05B 13/048* (2013.01); *H02J 3/00* (2013.01); *H02J 3/32* (2013.01);
(Continued)

(58) Field of Classification Search
CPC .. H02J 3/383; H02J 2007/0067; H02J 7/0054; H02J 15/00; H02J 3/34;
(Continued)

(56) References Cited

U.S. PATENT DOCUMENTS

| | | | |
|---|---|---|---|
| 7,089,190 B2 * | 8/2006 | Tsui | G06Q 10/06 705/63 |
| 7,920,942 B2 * | 4/2011 | Lasseter | H02J 9/062 323/212 |

(Continued)

FOREIGN PATENT DOCUMENTS

| | | |
|---|---|---|
| EP | 2 654 164 A1 | 10/2013 |
| JP | 2008-141918 A | 6/2008 |

(Continued)

OTHER PUBLICATIONS

International Search Report corresponding to PCT/JP2016/057227, dated Jun. 7, 2016 (5 pages).

*Primary Examiner* — Darrin D Dunn
(74) *Attorney, Agent, or Firm* — Wilmer Cutler Pickering Hale and Dorr LLP

(57) ABSTRACT

A problem to be solved is to optimize a storage schedule in which changes in power (W) stored in an energy storage apparatus with time are determined, and an output upper limit (W) of a renewable energy power supply. In order to solve the problem, the invention provides a power control apparatus (10) that stores in an energy storage apparatus an amount of power exceeding an output upper limit instruction value (W), which is determined by an electricity company in power (W) generated by a power generation apparatus, the power control apparatus (10) including a decision unit (11) that decides a storage schedule in which changes in the power (W) to be stored in the energy storage apparatus with time within a predetermined period of time are determined, on the basis of prediction data on changes in the power (W) generated by the power generation apparatus with time within the predetermined period of time and values of
(Continued)

various types of power classified on the basis of the output upper limit instruction value (W) within the predetermined period of time.

25 Claims, 13 Drawing Sheets

(51) Int. Cl.
*H02J 7/35* (2006.01)
*H02J 3/00* (2006.01)
*H02J 3/48* (2006.01)
*H02J 3/32* (2006.01)
*G05B 13/04* (2006.01)

(52) U.S. Cl.
CPC ............. *H02J 3/38* (2013.01); *H02J 3/382* (2013.01); *H02J 3/48* (2013.01); *H02J 7/35* (2013.01)

(58) Field of Classification Search
CPC .. H02J 7/041; H02J 7/14; Y02E 70/30; Y02E 10/763; Y02E 10/563; Y02E 10/566; G06Q 10/04; G05B 15/02; G05B 13/026; Y10T 307/625; Y10T 307/516
See application file for complete search history.

(56) References Cited

U.S. PATENT DOCUMENTS

| | | | | |
|---|---|---|---|---|
| 8,295,986 B2* | 10/2012 | Vaidyanathan | ........ | G01D 4/002 700/286 |
| 8,334,606 B2* | 12/2012 | Oohara | .................. | F03D 7/028 290/44 |
| 8,638,061 B2* | 1/2014 | Moore | .................. | H02J 7/0013 320/103 |
| 8,688,286 B2* | 4/2014 | Nelson | ...................... | H02J 3/28 700/297 |
| 8,914,158 B2* | 12/2014 | Geinzer | .................... | H02J 3/32 700/295 |
| 8,952,663 B2* | 2/2015 | Okuda | ................ | H01M 10/441 320/134 |
| 9,026,259 B2* | 5/2015 | Zadeh | ................ | H02J 13/0013 700/291 |
| 9,203,261 B2* | 12/2015 | Sugiyama | ............. | E02F 9/2091 |
| 10,209,729 B2* | 2/2019 | Hashimoto | .............. | H02J 3/14 |
| 10,283,964 B2* | 5/2019 | Wagoner | ................ | F03D 7/042 |
| 10,389,165 B2* | 8/2019 | Hashimoto | ............ | G06Q 50/06 |
| 2005/0134120 A1* | 6/2005 | Nguyen | ..................... | H02J 3/04 307/43 |
| 2008/0033786 A1* | 2/2008 | Boaz | ....................... | G06F 17/50 705/7.31 |
| 2008/0167756 A1* | 7/2008 | Golden | .................. | G05B 15/02 700/297 |
| 2009/0295162 A1* | 12/2009 | Oohara | .................. | F03D 7/028 290/44 |
| 2009/0326724 A1* | 12/2009 | Lasseter | .................. | H02J 9/062 700/287 |
| 2010/0127664 A1* | 5/2010 | Paice | ....................... | H02J 3/32 320/134 |
| 2010/0308765 A1* | 12/2010 | Moore | .................. | H02J 7/0013 320/103 |
| 2011/0077786 A1* | 3/2011 | Vaidyanathan | ........ | G01D 4/002 700/287 |
| 2011/0112703 A1* | 5/2011 | Lundberg | ................ | G06Q 10/00 700/297 |
| 2011/0204720 A1* | 8/2011 | Ruiz | ....................... | G06Q 50/06 307/66 |
| 2011/0221276 A1* | 9/2011 | Geinzer | .................... | H02J 3/32 307/66 |
| 2011/0238232 A1* | 9/2011 | Tomita | ...................... | H02J 3/32 700/291 |
| 2012/0232711 A1* | 9/2012 | Kiuchi | ...................... | H02J 3/38 700/291 |
| 2012/0248873 A1* | 10/2012 | Oudalov | .................. | H02J 3/32 307/52 |
| 2013/0013233 A1* | 1/2013 | Murakami | ................ | H02J 3/38 702/60 |
| 2013/0024042 A1* | 1/2013 | Asghari | .................. | H02J 3/381 700/295 |
| 2013/0041517 A1* | 2/2013 | Nelson | ....................... | H02J 3/28 700/292 |
| 2013/0166084 A1* | 6/2013 | Sedighy | .................. | G06Q 50/06 700/291 |
| 2013/0173075 A1* | 7/2013 | Mitsumoto | ............... | H02J 3/00 700/291 |
| 2013/0187385 A1* | 7/2013 | Wakasa | ..................... | H02P 9/04 290/44 |
| 2013/0190938 A1* | 7/2013 | Zadeh | ................. | H02J 13/0013 700/291 |
| 2013/0211616 A1* | 8/2013 | Moore | ................... | H02J 7/0013 700/295 |
| 2013/0229059 A1* | 9/2013 | Baba | ....................... | H02J 3/008 307/35 |
| 2013/0241495 A1* | 9/2013 | Min | .......................... | H02J 3/32 320/134 |
| 2013/0253717 A1* | 9/2013 | Sakakibara | ............. | G06Q 50/06 700/291 |
| 2014/0025214 A1* | 1/2014 | Ito | .............................. | G05F 5/00 700/291 |
| 2014/0025220 A1* | 1/2014 | Carlson | ............. | H01L 31/02021 700/296 |
| 2014/0163754 A1* | 6/2014 | Potter | ....................... | H02J 3/32 700/287 |
| 2014/0172329 A1* | 6/2014 | Zhang | .................... | G06Q 50/06 702/60 |
| 2014/0184136 A1* | 7/2014 | Ture | ...................... | H02J 7/0052 320/101 |
| 2014/0253037 A1* | 9/2014 | Yano | ...................... | B60L 58/13 320/109 |
| 2014/0277599 A1* | 9/2014 | Pande | .................... | G06Q 50/06 700/22 |
| 2014/0350743 A1* | 11/2014 | Asghari | ............... | G05B 13/048 700/297 |
| 2015/0019034 A1* | 1/2015 | Gonatas | ............ | H01L 31/02021 700/291 |
| 2015/0039145 A1* | 2/2015 | Yang | ....................... | G05B 13/02 700/291 |
| 2015/0105928 A1* | 4/2015 | Lazaris | .................... | H02J 3/382 700/295 |
| 2015/0240784 A1* | 8/2015 | Sagi | ........................ | F03D 7/048 700/287 |
| 2015/0244306 A1* | 8/2015 | Estes | ...................... | G05B 15/02 700/287 |
| 2015/0263523 A1* | 9/2015 | Goldman | ................ | F28D 20/02 307/43 |
| 2016/0056642 A1* | 2/2016 | Coe | .......................... | H02J 7/007 700/287 |
| 2016/0105140 A1* | 4/2016 | Taniguchi | ............ | G05B 13/041 700/287 |
| 2016/0190810 A1* | 6/2016 | Bhavaraju | ................ | H02J 3/383 307/20 |
| 2016/0241041 A1* | 8/2016 | Padros | ....................... | H02J 3/32 |
| 2016/0329713 A1* | 11/2016 | Berard | ....................... | H02J 3/24 |
| 2017/0003700 A1* | 1/2017 | Pavlovski | .............. | G06Q 50/06 |
| 2017/0005470 A1* | 1/2017 | Wagoner | ................ | F03D 7/042 |
| 2017/0089325 A1* | 3/2017 | Timbus | .................. | F03D 7/0292 |
| 2017/0104343 A1* | 4/2017 | ElBsat | ...................... | H02J 3/32 |
| 2017/0262946 A1* | 9/2017 | Murakami | ............. | G06Q 50/06 |
| 2017/0264135 A1* | 9/2017 | Hashimoto | ............ | G06Q 50/06 |
| 2017/0328346 A1* | 11/2017 | Hales | ....................... | F03D 7/02 |
| 2018/0233914 A1* | 8/2018 | Miki | ........................ | H02J 3/00 |
| 2019/0052088 A1* | 2/2019 | Johansson | ............ | G05B 19/042 |
| 2019/0074693 A1* | 3/2019 | Kudo | ....................... | H02J 3/28 |

FOREIGN PATENT DOCUMENTS

| | | |
|---|---|---|
| JP | 2010-233362 A | 10/2010 |
| JP | 2013-005537 A | 1/2013 |
| JP | 2014-187876 A | 10/2014 |

* cited by examiner

FIG. 4

| POWER GENERATION APPARATUSES ID | RATED OUTPUT | INSTALLATION POSITION | · · · · |
|---|---|---|---|
| ⋮ | ⋮ | ⋮ | ⋮ |

FIG. 5

| ENERGY STORAGE APPARATUSES ID | TYPE | RATED OUTPUT (w) | RATED CAPACITY (wh) | |
|---|---|---|---|---|
| . . . . | . . . . | . . . . | . . . . | . . . . |

# POWER CONTROL APPARATUS, POWER CONTROL SYSTEM, AND POWER CONTROL METHOD

TECHNICAL FIELD

The present invention relates to a power control apparatus, a power control system, a power control method, and a program.

CROSS-REFERENCE TO RELATED APPLICATIONS

This application is a national stage application of International Application No. PCT/JP2016/057227 entitled "POWER CONTROL APPARATUS, POWER CONTROL SYSTEM, AND POWER CONTROL METHOD, AND PROGRAM," filed on Mar. 8, 2016, the disclosure of which is hereby incorporated by reference in its entirety.

BACKGROUND ART

There have been known power generation apparatuses (hereinafter, also referred to as "renewable energy power supplies") which generate power by using renewable energy, such as solar power generation apparatuses and wind power generation apparatuses. The start of feed-in-tariff (FIT) for requiring power companies to purchase power generated by renewable energy power supplies at a fixed price has been one of the reasons that renewable energy power supplies connected to power systems have been rapidly increased.

When the renewable energy power supplies connected to the power systems are increased, a situation where the supply of power becomes excessively larger than power demand is assumed. As a method of avoiding this situation, a method of suppressing power generated by the renewable energy power supplies to a value equal to or less than a predetermined value is considered.

Patent Document 1 discloses a power generation system that suppresses power flowing in reverse to a power system (power network) from a renewable energy power supply. The power generation system suppresses power output from the renewable energy power supply such that an output voltage of the renewable energy power supply does not exceed an upper limit threshold value. The power generation system can store surplus power requiring the suppression of output power in a storage battery.

RELATED DOCUMENT

Patent Document

[Patent Document 1] Japanese Laid-open patent publication NO. 2013-5537

SUMMARY OF THE INVENTION

Technical Problem

The power generation of the renewable energy power supply is influenced by the natural environment (for example, sunlight or wind). Thus, power generated by the renewable energy power supply fluctuates in short cycles based on changes in the natural environment. Surplus power caused by the renewable energy power supply also fluctuates in short cycles based on changes in the natural environment. In a case of the power generation system disclosed in Patent Document 1, which stores surplus power in the storage battery, it is necessary to adjust power for charging the storage battery (to make the power consistent with the surplus power) in accordance with the fluctuations in the surplus power in short cycles, but the short cycle is often shorter than a rechargeable characteristic of charging the storage battery. Thus, there is a problem in that it is not possible to appropriately charge the storage battery while following fluctuations in the output of the renewable energy power supply. An object of the invention is to provide a technique capable of solving the problem.

Solution to Problem

According to the invention, there is provided a power control apparatus that stores an amount of power exceeding an output upper limit instruction value (W), which is determined by an electricity company in power (W) generated by a power generation apparatus, in an energy storage apparatus, the power control apparatus including a decision unit that decides a storage schedule in which changes in the power (W) to be stored in the energy storage apparatus with time within a predetermined period of time are determined, on the basis of prediction data on changes in the power (W) generated by the power generation apparatus with time within the predetermined period of time and values of various types of power classified on the basis of the output upper limit instruction value (W) within the predetermined period of time.

In addition, according to the invention, there is provided a power control system including the power control apparatus, a storage control apparatus that controls operation of an energy storage apparatus on the basis of a storage schedule in which changes in power (W) to be stored in the energy storage apparatus with time within a predetermined period of time are determined, which is decided by the power control apparatus, and a power generation control apparatus that controls operation of a power generation apparatus on the basis of an output upper limit (W) of the power generation apparatus within the predetermined period of time, which is decided by the power control apparatus.

In addition, according to the invention, there is provided a power control method executed by a computer of a power generation control apparatus, the power generation control apparatus storing in an energy storage apparatus an amount of power exceeding an output upper limit instruction value (W), which is determined by an electricity company in power (W) generated by a power generation apparatus, the method including a decision step of deciding a storage schedule in which changes in the power (W) to be stored in the energy storage apparatus with time within a predetermined period of time are determined, on the basis of prediction data on changes in the power (W) generated by the power generation apparatus with time within the predetermined period of time and values of various types of power classified on the basis of the output upper limit instruction value (W) within the predetermined period of time.

In addition, according to the invention, there is provided a program causing a computer of a power control apparatus storing in an energy storage apparatus an amount of power exceeding an output upper limit instruction value (W), which is determined by an electricity company in power (W) generated by a power generation apparatus to function as a decision unit that decides a storage schedule in which changes in the power (W) to be stored in the energy storage apparatus with time within a predetermined period of time"

are determined, on the basis of prediction data on changes in the power (W) generated by the power generation apparatus with time within the predetermined period of time and values of various types of power classified on the basis of the output upper limit instruction value (W) within the predetermined period of time.

Advantageous Effects of Invention

According to the invention, it is possible to realize a technique for optimizing a storage schedule in which changes in power (W) stored in an energy storage apparatus with time are determined, and an output upper limit (W) of a renewable energy power supply.

BRIEF DESCRIPTION OF THE DRAWINGS

The above-described objects, other objects, features and advantages will be further apparent from the preferred example embodiments described below, and the accompanying drawings as follows.

FIG. 4 is a schematic diagram illustrating an example of information registered in the power control apparatus according to the present example embodiment.

FIG. 5 is a schematic diagram illustrating an example of information registered in the power control apparatus according to the present example embodiment.

DESCRIPTION OF EXAMPLE EMBODIMENTS

First, an example of a hardware configuration of an apparatus (a power control apparatus, a power generation apparatus, an energy storage apparatus) according to the present example embodiment will be described. Units included in the apparatus according to the present example embodiment are realized by any combination of hardware and software on the basis of a central processing unit (CPU), a memory, a program loaded into the memory, a storage unit (can also store not only a program which has been stored in advance from the stage of shipping out the apparatus but also a program which is downloaded from a storage medium such as a compact disc (CD), or a server or the like on the Internet) such as a hard disk which stores the program, and an interface for network connection of an arbitrary computer. In addition, one skilled in the art can understand that various modification examples can be made to the realization method and the apparatus.

Figure 1:
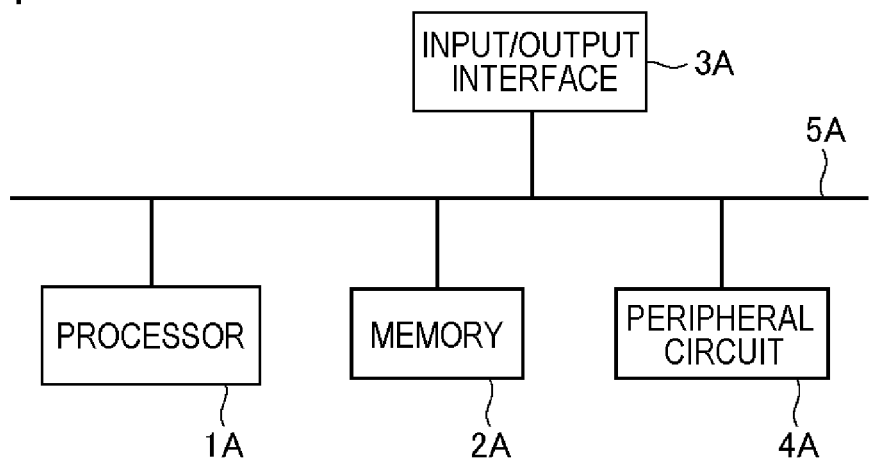
FIG. 1 is a schematic diagram illustrating an example of a hardware configuration of an apparatus according to the present example embodiment.

FIG. 1 is a block diagram illustrating a hardware configuration of an apparatus according to the present example embodiment. As illustrated in FIG. 1, the apparatus includes a processor 1A, a memory 2A, an input/output interface 3A, a peripheral circuit 4A, and a bus 5A. The peripheral circuit includes various modules.

The bus 5A is a data transmission line through which the processor 1A, the memory 2A, the peripheral circuit 4A, and the input/output interface 3A transmit and receive data to and from each other. The processor 1A is computational processing apparatus such as a Central Processing Unit (CPU) or a Graphics Processing Unit (GPU). The memory 2A is a memory such as a Random Access Memory (RAM) or a Read Only Memory (ROM). The input/output interface 3A includes an interface for acquiring information from an external apparatus, an external server, an external sensor, or the like, and the like. The processor 1A gives an instruction to modules, and performs computation on the basis of computational results thereof.

Hereinafter, the present example embodiment will be described. Note that functional block diagrams used in describing the following example embodiment show function-based blocks rather than hardware-based configurations. In the functional block diagrams, although a description is given such that each apparatus is configured with one apparatus, the configuration means therefor is not limited thereto. In other words, each apparatus may be configured to be physically or logically separated. Note that the same components will be denoted by the same reference numerals and signs, and a description thereof will not be repeated.

First Example Embodiment

Figure 2:
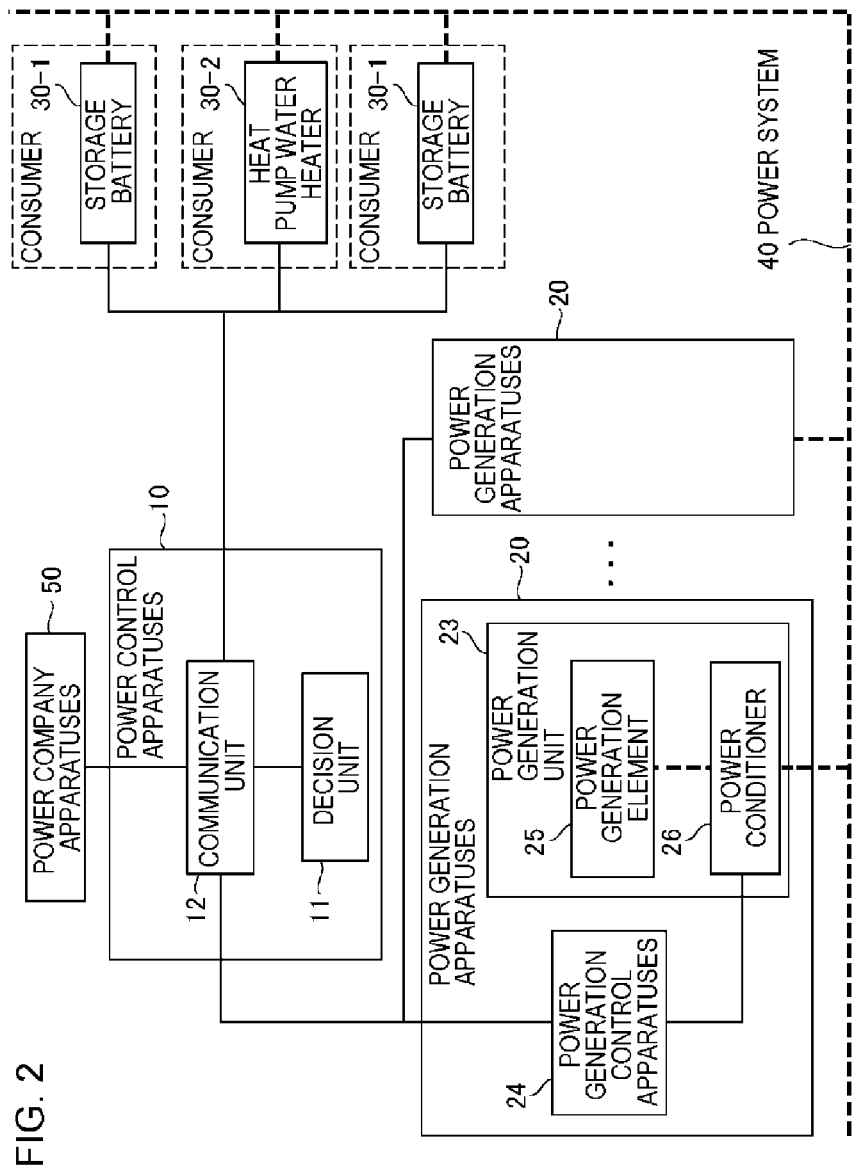
FIG. 2 is an example of a functional block diagram illustrating the whole image of a power control system according to the present example embodiment.

First, the whole image of a power control system according to the present example embodiment will be described with reference to FIG. 2. The power control system according to the present example embodiment includes a power control apparatus 10, a plurality of power generation apparatuses 20, and a plurality of energy storage apparatuses 30. Note that a storage battery 30-1 and a heat pump water heater 30-2 are shown as examples of the energy storage apparatuses 30 in the drawing.

The power generation apparatus 20 is an apparatus that generates power by using natural energy such as sunlight, wind power, or terrestrial heat. The power generation apparatus 20 corresponds to the above-described renewable energy power supply. Any configuration of conventional art can be adopted for the power generation apparatus 20. The power generation apparatus 20 may be a large-scale power generation apparatus (for example, a mega solar power generator or the like) which is managed by a company, or may be a small-scale power generation apparatus which is managed by an ordinary home.

The energy storage apparatus 30 is configured to store supplied power as predetermined energy. Examples of the energy storage apparatus to be considered include a storage battery storing supplied power as power, a heat pump water heater converting supplied power into heat energy and storing the heat energy, and the like, but are not limited thereto. Any configuration of conventional art can be adopted for the energy storage apparatus 30. The energy storage apparatus 30 may be a large-scale energy storage apparatus which is managed by a company, or may be a small-scale energy storage apparatus which is managed by an ordinary home.

The power control apparatus 10 controls operations of the plurality of power generation apparatuses 20 and the plurality of energy storage apparatuses 30 in order to store the total surplus power (W) of the plurality of power generation apparatuses 20 in the plurality of energy storage apparatuses 30.

That is, the power control apparatus 10 receives a power generation control instruction for the power generation apparatus 20 to be managed from, for example, a power company apparatus 50. Note that the power control apparatus 10 may receive the power generation control instruction from each of the power generation apparatuses 20 in a case where the power company apparatus 50 transmits the power generation control instruction to each of the power generation apparatuses 20.

The power generation control instruction includes a suppression time slot (for example, from 13:00 p.m. to 15:00 p.m. on Feb. 2, 2016) in which the suppression of power generation is performed, and suppression contents. In addition, the power generation control instruction may include information for identifying the power generation apparatus 20 to be suppressed.

In the suppression contents, an output upper limit instruction value (W) for each unit time slot (for example, 15 minutes, 30 minutes, or one hour) is shown. That is, the suppression contents include "an instruction for output equal to or less than the output upper limit instruction value (W)". The output upper limit instruction value may be shown by a ratio with respect to a rated output (W) of each of the power generation apparatuses 20, or may be shown by power (W) itself.

In the present example embodiment, "surplus power (W)" means an amount of power exceeding the output upper limit instruction value (W) determined by an electricity company, in the power (W) generated by each of the power generation apparatuses 20. In addition, "total surplus power (W)" means the total of surplus power (W) of the plurality of power generation apparatuses 20.

When the power control apparatus 10 receives the power generation control instruction, the power control apparatus 10 decides an output upper limit (W) of each of the plurality of power generation apparatuses 20 in a suppression time slot, and a storage schedule in which changes in the power (W) stored in each of the plurality of energy storage apparatuses 30 with time in the suppression time slot are determined is decided before the suppression time slot (for example, the day before a day to which the suppression time slot belongs). Note that the total surplus power (W) is stored in the plurality of energy storage apparatuses 30 in a case of the present example embodiment, and thus the output upper limit (W) of each of the plurality of power generation apparatuses 20 determined by the power control apparatus 10 tends to be larger than the output upper limit instruction value (W).

After the output upper limit (W) is decided, the power control apparatus 10 notifies each of the plurality of power generation apparatuses 20 of the decided output upper limit (W) before the suppression time slot. After the storage schedule is decided, the power control apparatus 10 notifies each of the plurality of energy storage apparatuses 30 of the decided storage schedule before the suppression time slot.

The energy storage apparatus 30 executes an operation of storing energy based on the storage schedule notified by the power control apparatus 10 during the suppression time slot. In addition, the power generation apparatus 20 controls an output so as not to exceed the output upper limit (W) notified by the power control apparatus 10 during the suppression time slot.

The power control apparatus 10 according to the present example embodiment can decide an optimal output upper limit (W) and a storage schedule. Hereinafter, a detailed description will be given.

Figure 3:
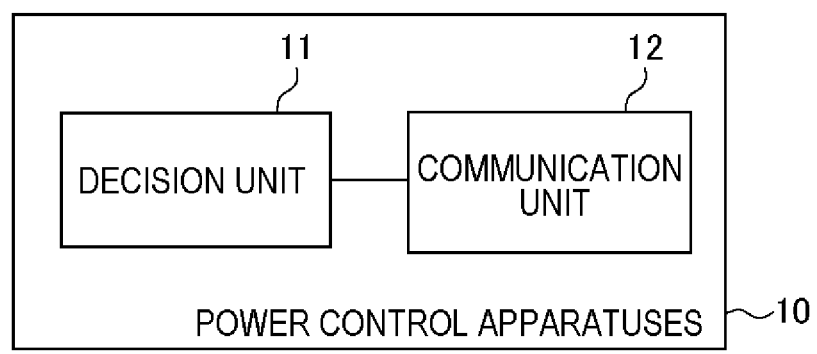
FIG. 3 is an example of a functional block diagram of a power control apparatus according to the present example embodiment.

FIG. 3 illustrates an example of a functional block diagram of the power control apparatus 10. As illustrated in the drawing, the power control apparatus 10 includes a decision unit 11 and a communication unit 12.

First, the plurality of power generation apparatuses 20 and the plurality of energy storage apparatuses 30 which are to be managed are registered in the power control apparatus 10. The power control apparatus 10 decides an output upper limit (W) of each of the plurality of power generation apparatuses 20 and a storage schedule of each of the plurality of energy storage apparatuses 30 on the assumption that a total surplus power (W) of the plurality of power generation apparatuses 20 to be managed is stored in the plurality of energy storage apparatuses 30 to be managed.

For example, attribute information on each of the power generation apparatuses 20 as illustrated in FIG. 4 is registered in the power control apparatus 10 in advance. In FIG. 4, a power generation apparatus ID (Identifier) for identifying each of the plurality of power generation apparatuses 20, a rated output (W) of each of the power generation apparatuses 20, and an installation position of each of the power generation apparatuses 20 are associated with each other. Note that some of the pieces of attribute information may not be included, and other pieces of attribute information may be further registered. For example, address information on a network of each of the power generation apparatuses 20 may be further registered.

In addition, for example, attribute information on each of the energy storage apparatuses 30 as illustrated in FIG. 5 is registered in the power control apparatus 10 in advance. In FIG. 5, an energy storage apparatus ID for identifying each of the plurality of energy storage apparatuses 30, the type of each of the energy storage apparatuses 30, a rated output (W) of each of the energy storage apparatuses 30, and a rated capacity (Wh) of each of the energy storage apparatuses 30 are associated with each other. The type indicates classification based on energy storage means, such as a storage battery and a heat pump water heater, or the like. Note that some of the pieces of attribute information may not be included, and other pieces of attribute information may be further registered. For example, address information on a network of each of the energy storage apparatuses 30 may be further registered.

Referring back to FIG. 3, the decision unit 11 decides a storage schedule in which changes in power (W) stored in each of the plurality of energy storage apparatuses 30 with time within a predetermined period of time (suppression time slot) are determined, and an output upper limit (W) of each of the plurality of power generation apparatuses 20 within the predetermined period of time, on the basis of prediction data on changes in power (W) generated by each of the plurality of power generation apparatuses 20 with time within the predetermined period of time, an output upper limit instruction value (W) of each of the plurality of power generation apparatuses 20 within the predetermined period of time, and values of various types of power classified in accordance with attributes.

The "various types of power" are classified on the basis of the prediction data on changes in power (W) generated by each of the plurality of power generation apparatuses 20 with time within the predetermined period of time and the output upper limit instruction values (W) (attributes) within the predetermined period of time.

The decision unit 11 decides a storage schedule of each of the plurality of energy storage apparatuses 30 in order to store an amount of power exceeding the total of the output upper limit instruction values (W) of the plurality of power generation apparatuses 20 which are determined by the electricity company, in the total of the power (W) generated by the plurality of power generation apparatuses 20, in the plurality of energy storage apparatuses 30.

The decision unit 11 according to the present example embodiment decides a storage schedule and an output upper limit (W) such that a predetermined value defined using the prediction data, the output upper limit instruction value (W), the values of the various types of power, the storage schedule, and the output upper limit (W) is maximized (or minimized). For example, the decision unit 11 decides optimal solutions of the storage schedule and the output upper limit (W) such that an objective function (a function representing the predetermined value) defined using the prediction data, the output upper limit instruction value (W), the values of the various types of power, the storage schedule, and the output upper limit (W) is maximized (or minimized). For example, an optimal solution for maximizing an objective function regarding a gain is decided. Alternatively, an optimal solution for minimizing an objective function regarding a loss is decided.

Here, an objective function handled by the decision unit 11 will be described. In the present example embodiment, pieces of power related to the processing of the power control system are grouped in accordance with attributes. A description will be given with reference to FIG. 6.

Figure 6:
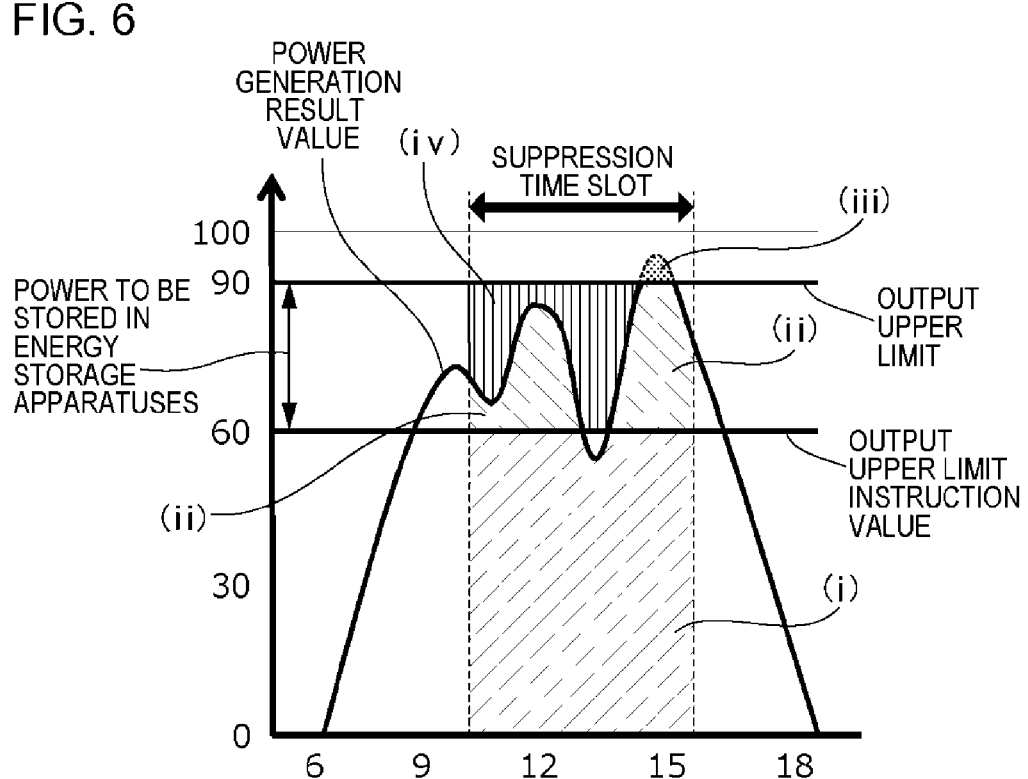
FIG. 6 is a diagram illustrating processing contents of the power control apparatus according to the present example embodiment.

In a graph of FIG. 6, the horizontal axis represents a time, and the vertical axis represents power by a ratio with respect to a rated output (W) of the power generation apparatus 20. A solid line indicates changes in the total of power generation results (in the drawing, a "power generation result value") of the plurality of power generation apparatuses 20 with time.

In the drawing, a time slot between 10:00 a.m. and 16:00 p.m. is set to be a suppression time slot. An output upper limit instruction value (W) in this time slot is 60% of the rated output (W). Here, for convenience of description, the output upper limit instruction value (W) is fixed during the suppression time slot. However, the output upper limit instruction value (W) may vary for each unit time slot. In addition, the same output upper limit instruction value (W) is imposed on all of the plurality of power generation apparatuses 20 for the same reason. However, a different output upper limit instruction value (W) may be imposed for each power generation apparatus 20.

In the drawing, the total of power (W) corresponding to 30% of the rated output (W) of the plurality of power generation apparatuses 20 is set to be a storage schedule to be stored in the energy storage apparatus 30. Here, for convenience of description, the power (W) stored in the energy storage apparatus 30 is fixed during the suppression time slot. However, power (W) to be stored in the energy storage apparatus 30 may be different for each unit time slot.

Further, in the drawing, 90% of the rated output (W) is determined to be an output upper limit (W) of the power generation apparatus 20. This is equivalent to the sum of the output upper limit instruction value (W) and the power (W) stored in the energy storage apparatus 30. Here, for convenience of description, the output upper limit (W) of the power generation apparatus 20 is fixed during the suppression time slot. However, the output upper limit (W) may fluctuate for each unit time slot. In addition, for the same reason it is assumed that the same output upper limit (W) is set for all of the plurality of power generation apparatuses 20. However, a different output upper limit (W) may be set for each power generation apparatus 20.

In the present example embodiment, power related to the processing of the power control system is divided into the following four groups in accordance with attributes.

A first group represents power in a portion indicated by (i) in FIG. 6. Specifically, the power is power (W) sold to an electricity company with the output upper limit instruction value (W) as an upper limit, in the power (W) (in the drawing, the "power generation result value") which is generated by the power generation apparatus 20 in the suppression time slot. In the present example embodiment, the amount of power of the first group in the suppression time slot is set to be M1 (Wh), and the value thereof is set to be a1 (/Wh).

A second group represents power in a portion indicated by (ii) in FIG. 6. Specifically, the power, corresponding to an amount of power exceeding the output upper limit instruction value (W) in the power (W) generated by the power generation apparatus 20, is power to be stored in the energy storage apparatus 30. In more detail, the power is power (W) (actually generated) of which the generation is supposed to be suppressed in a case where there is no process of storing the amount of power exceeding the output upper limit instruction value (W) in the energy storage apparatus 30, in the power (W) (in the drawing, the "power generation result value") which is generated by the power generation apparatus 20 in the suppression time slot. The power of the group can also be considered to be power (W) of which the generation is supposed to be suppressed in a case where there is no process of storing the amount of power exceeding the output upper limit instruction value (W) in the energy storage apparatus 30, in the power (W) stored in the energy storage apparatus 30 in the suppression time slot on the basis of the storage schedule. In the present example embodiment, the amount of power of the second group in the suppression time slot is set to be M2 (Wh), and the value thereof is set to be a2 (/Wh).

A third group represents power in a portion indicated by (iii) in FIG. 6. Specifically, the power, corresponding to an amount of power exceeding the output upper limit (W), is power (W) (not actually generated) of which the generation is suppressed in the suppression time slot. In the present example embodiment, the amount of power of the third group in the suppression time slot is set to be M3 (Wh), and the value thereof is set to be a3 (/Wh).

A fourth group represents power in a portion indicated by (iV) in FIG. 6. Specifically, the power is power (W) obtained by subtracting the power (W) of the second group from the power (W) stored in the energy storage apparatus 30 in the suppression time slot on the basis of the storage schedule. Incidentally, in a case of a model illustrated in FIG. 6, the power (W) of the group is positioned above the power generation result value. That is, it cannot be covered by the results of the power generation apparatus 20. Thus, the power (W) of the group is supplied to the energy storage apparatus 30 from an electricity company (purchased from the electricity company). That is, in a case of the model illustrated in FIG. 6, the power (W) of the group is power charged by purchasing power from a system. In a case of the model illustrated in FIG. 6, a purchase charge from the electricity company increases with an increase in the power of the fourth group. Thus, it is preferable that the power of the fourth group is reduced from the viewpoint of increasing a gain. In the present example embodiment, the amount of power of the fourth group in the suppression time slot is set to be M4 (Wh), and the value thereof is set to be a4 (/Wh).

The decision unit 11 decides an optimal solution of a storage schedule and the output upper limit (W) for maximizing an evaluation value V by using evaluation value V=M1×a1+M2×a2−M3×a3+M4×a4 as an objective function. Note that signs may be inverted, and an optimal solution of a storage schedule and the output upper limit (W) for minimizing the objective function may be decided. Hereinafter, an example of a calculation formula for calculating M1 to M4 mentioned above will be described.

The values a1 to a4 are decided in advance, and are given to the decision unit 11. Units thereof are not particularly limited, but, for example, yen/kWh is considered. A storage schedule and an output upper limit (W) for setting a balance of the values of M1 to M4 (amounts (Wh) of various types of power) to be in a desired state are determined by setting the sign of each of the values a1 to a4, magnitude relations between the values a1 to a4, and the like to be in a desired state. In a case of the present example embodiment where an optimal solution of a storage schedule and the output upper limit (W) for maximizing the evaluation value V is decided, the value of power of which the amount is desired to be increased is set to be higher than the value of other power. For example, the value a1 is set to be a so-called FIT price, and values of a2 to a4 may be decided on the basis of the value a1. As an example, a1≥a3≥a4>a2≥0 and the like are considered, but is not limited thereto.

The prediction data on changes in the power (W) generated by the power generation apparatus 20 with time may be data on a predicted probability distribution of the generated power (W) at each point in time (data indicating a probability of generation of each of different power (W) generated, in association with each of different points in time). That is, the decision unit 11 may decide a storage schedule and an output upper limit (W) by using the prediction data. In this case, for example, the generated power (W) in the suppression time slot is given as a probability variable, and M1 to M4 mentioned above can be defined using the probability variable.

A solution of an optimization problem is not particularly limited, and any method can be adopted. For example, a widely known interior point method and the like may be adopted.

Note that the decision unit 11 may obtain an optimal solution of the objective function under predetermined constraint conditions. For example, the following constraint conditions are considered.

(First Constraint Condition)

"A storage schedule and an output upper limit (W) are decided such that the sum of the output upper limit instruction value (W) and the power (W) stored in the energy storage apparatus 30 on the basis of the storage schedule is equal to or less than the output upper limit (W)."

In a case of the present example embodiment in which the plurality of power generation apparatuses 20 and the plurality of energy storage apparatuses 30 are handled, the constraint condition can be solved as follows.

"A storage schedule of each of the plurality of energy storage apparatuses 30 and an output upper limit (W) of each of the plurality of power generation apparatuses 20 are decided such that a sum of the total of output upper limit instruction values (W) of the plurality of power generation apparatuses 20 and the total of the power (W) stored in the plurality of energy storage apparatuses 30 does not exceed the total of the output upper limits (W) of the plurality of power generation apparatuses 20."

(Second Constraint Condition)

"A storage schedule and an output upper limit (W) are decided such that the amount of power (Wh) to be stored in the energy storage apparatus 30 in the suppression time slot on the basis of the storage schedule is set to be equal to or less than "the amount of power (Wh) which can be stored in the energy storage apparatus 30 in the suppression time slot" which is determined on the basis of state information on the energy storage apparatus 30."

In a case of the present example embodiment in which the plurality of power generation apparatuses 20 and the plurality of energy storage apparatuses 30 are handled, the constraint condition can be solved as follows.

"A storage schedule of each of the plurality of energy storage apparatuses 30 and an output upper limit (W) of each of the plurality of power generation apparatuses 20 are decided such that the total of the amounts of power (Wh) to be stored in the plurality of energy storage apparatuses 30 in the suppression time slot on the basis of the storage schedule does not exceed the total of "the amounts of power (Wh) which can be stored in the energy storage apparatuses 30 in the suppression time slot" which are determined on the basis of the state information on each of the energy storage apparatuses 30."

As the state information, State of Charge (SOC) immediately before the suppression time slot, the estimated value thereof, State Of Charge (SOC) during the suppression time slot, the estimated value thereof, and the like are considered.

(Third Constraint Condition)

"A storage schedule and an output upper limit (W) are decided such that power (W) to be stored in the energy storage apparatus 30 in the suppression time slot on the basis of the storage schedule is set to be equal to or less than "power (W) which can be stored in the energy storage apparatus 30 in the suppression time slot" which is determined on the basis of state information on the energy storage apparatus 30."

In a case of the present example embodiment in which the plurality of power generation apparatuses 20 and the plurality of energy storage apparatuses 30 are handled, the constraint condition can be solved as follows.

"A storage schedule of each of the plurality of energy storage apparatuses 30 and an output upper limit (W) of each of the plurality of power generation apparatuses 20 are decided such that the total of power (W) to be stored in the plurality of energy storage apparatuses 30 in the suppression time slot on the basis of the storage schedule does not exceed the total of "power (W) which can be stored in the energy storage apparatuses 30 in the suppression time slot" which is determined on the basis of state information on each of the energy storage apparatuses 30."

It is possible to decide a storage schedule and an output upper limit (W) which are capable of reducing the occurrence of a situation where the supply of power to the power system 40 is excessively increased, on the basis of the first to third constraint conditions.

Hereinafter, specific examples of an objective function and a constraint condition will be described. Note that these are merely examples, and are not limited thereto.

Here, a description will be given on the basis of a model, illustrated in FIG. 7, which is obtained by partially correcting the model illustrated in FIG. 6. Note that calculation may be performed on the basis of the model illustrated in FIG. 6. Also in a case of the model illustrated in FIG. 6, calculation can be performed in the same manner as in the case of the model illustrated in FIG. 7. Incidentally, there are the following differences between the model illustrated in FIG. 6 and the model illustrated in FIG. 7.

In the model illustrated in FIG. 6, power (W) generated by the power generation apparatus 20 is preferentially allocated to the first group (i). In a case where the power (W) generated by the power generation apparatus 20 exceeds the output upper limit instruction value (W), an excess thereof is set to be power (W) of the second group (ii). On the other hand, in the model illustrated in FIG. 7, power (W) generated by the power generation apparatus 20 is preferentially allocated to the second and fourth groups ((ii) and (iv)). In a case where the power (W) generated by the power generation apparatus 20 exceeds power (W) to be stored in the energy storage apparatus 30 on the basis of the storage schedule (in the drawing, in a case where 30% of the rated output is exceeded), an excess thereof is set to be power (W) of the first group (i). In both the models, the points of view for the power of the first to fourth groups are the same as each other. Note that, in a case of the model illustrated in FIG. 7, the power of the fourth group is considered to be power obtained by charging the energy storage apparatus 30 with a portion of power (W) which can be sold to an electricity company (for example, electric power selling through the FIT scheme). In a case of the model illustrated in FIG. 7, a charge for electric power sold to the electricity company decreases with an increase in the power of the fourth group, and thus a loss increases. Thus, it is preferable to reduce the power of the fourth group from the viewpoint of increasing a gain.

Figure 7:
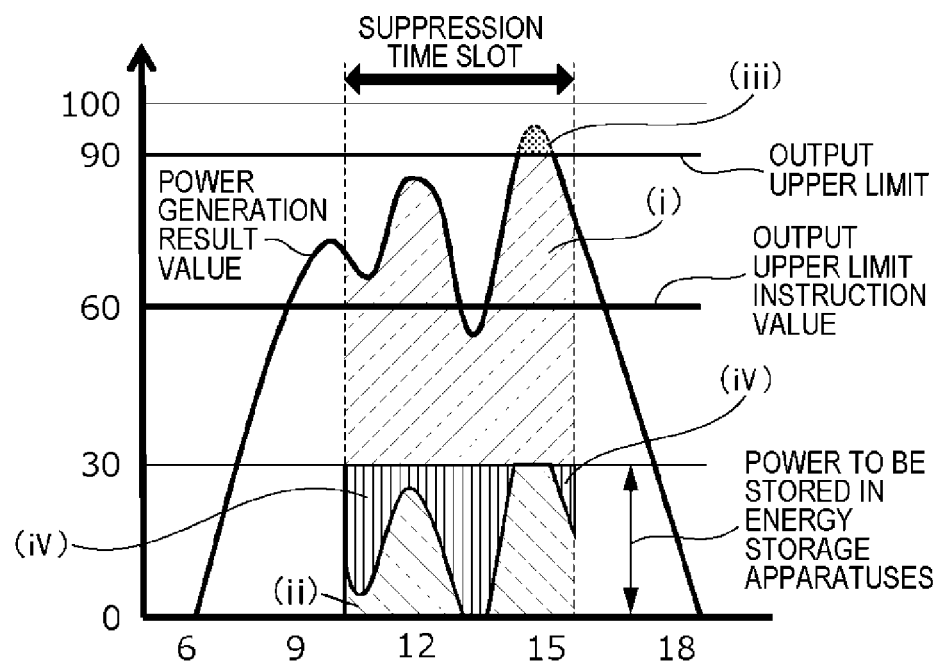
FIG. 7 is a diagram illustrating processing contents of the power control apparatus according to the present example embodiment.

A value I1 of the first group in the model illustrated in FIG. 7 is expressed by the following Expression (1-1).

$$I_1 := a_1 \left\{ \sum_n \min(r_t^n, X_t^n) - \sum_n y_t^n \right\} \tag{1-1}$$

Here, n denotes a serial number of the power generation apparatus 20, t denotes a serial number of each of a plurality of unit times included in the suppression time slot, $r_t^n$ denotes an output upper limit (W) of the power generation apparatus 20 of the serial number n in the unit time slot of the serial number t, and $X_t^n$ denotes a probability variable of a predicted power generation value of the power generation apparatus 20 of the serial number n in the unit time slot of the serial number t. In a case of the example, data on a predicted probability distribution of generated power (W) at each point in time is given as prediction data on changes in the power (W) generated by the power generation apparatus 20 with time in the suppression time slot. Here, $y_t^n$ denotes the amount of power (W) for charging the energy storage apparatus 30 in the power (W) generated by the power generation apparatus 20 of the serial number n.

A value I2 of the second group in the model illustrated in FIG. 7 is expressed by the following Expression (1-2).

$$I_2 := a_2 \max\left( 0, \sum_n \min(r_t^n, X_t^n) - M_t \right) \tag{1-2}$$

Here, $M_t$ denotes the total of output upper limit instruction values (W) of the plurality of power generation apparatuses 20 in the unit time slot of the serial number t.

A value I3 of the third group in the model illustrated in FIG. 7 is expressed by the following Expression (1-3). In a case of the expression, it can be understood that the value I3 of the third group is set to be equal to or less than 0 on the assumption that a3≥0.

$$I_3 := a_3 \left\{ \sum_n \min(r_t^n, X_t^n) - \sum_n X_t^n \right\} \tag{1-3}$$

A value I4 of the fourth group in the model illustrated in FIG. 7 is expressed by the following Expression (1-4).

$$I_4 := a_4 \min\left( \sum_n y_t^n + M_t - \sum_n \min(r_t^n, X_t^n), \sum_n y_t^n \right) \tag{1-4}$$

The sum of the values of the first to fourth groups is expressed by the following Expression (2).

$$\sum_t \mathbb{E}[I_1 + I_2 + I_3 + I_4] \tag{2}$$

In this manner, the values of the groups and the total sum thereof are given by a probability variable having $r_t^n$ and $y_t^n$ as parameters.

The decision unit 11 obtains optical solutions of $r_t^n$ and $y_t^n$ for maximizing an objective function with a function representing the total sum expressed by Expression (2) as the objective function.

Here, for convenience of description, the suffix of the unit time slot is omitted, and the following Expression (3) is established. In addition, a cutoff (censored random variable) of a probability variable X by the following Expression (4) is represented by $(X)_\mu$.

$$y := \sum_n y_t^n \tag{3}$$

$$u \in \mathbb{R} \tag{4}$$

In this case, the values of the groups are expressed by the following Expressions (5) to (8). Here, μ denotes prediction value (expectation value).

$$\mathbb{E}[I_1] = a_1 \left\{ \sum_n \mathbb{E}[(X_n)_{r_n}] - y \right\} \tag{5}$$

$$\mathbb{E}[I_2] = a_2 \mathbb{E}\left[ \max\left(0, \sum_n (X_n)_{r_n} - M\right) \right] \tag{6}$$

$$= a_2 \int_{\{\sum_n (X_n)_{r_n} \geq M\}} \left( \sum_n (X_n)_{r_n} - M \right) dP.$$

-continued $$\mathbb{E}[I_3] = a_3 \left\{ \sum_n \mathbb{E}[(X_n)_{r_n}] - \sum_n \mu_n \right\} \quad (7)$$

$$\mathbb{E}[I_4] = a_4 \mathbb{E}\left[ \min\left( y + M - \sum_n (X_n)_{r_n}, y \right) \right] \quad (8)$$

$$= a_4 y + a_4 \int_{\{\Sigma_n(X_n)_{r_n} \geq M\}} \left( M - \sum_n (X_n)_{r_n} \right) dP.$$

The total sum of the values in Expression (2) is expressed by the following Expression (9) from Expression (2) and Expression (5) to Expression (8). Note that Ω denotes an event set (probability space).

$$(a_1 + a_2) \sum_n \int_\Omega (X_n)_{r_n} dP - a_1 \sum_n \mu_n + \quad (9)$$

$$(a_4 - a_2) y - (a_4 - a_3) \int_{\{\Sigma_n(X_n)_{r_n} \geq M\}} \left( \sum_n (X_n)_{r_n} - M \right) dP$$

The decision unit 11 maximizes Expression (9), for example, under certain constraints on r and y. Here, noting that partial optimization can be performed on r, it can be understood that a maximum point r(y) of a function (objective function) expressed by the following Expression (11), for example, on a constraint region expressed by the following Expression (10) when y is given in each unit time slot, and optimization may be finally performed on y. Here, this is performed on the assumption shown in the following Expression (12).

$$D_0(y) := \left\{ r = (r_1, \ldots, r_n) : r_n \geq 0, \sum_n r_n \leq M + y \right\} \quad (10)$$

$$\Phi(r) := \alpha \int_\Omega \left( \sum_n (X_n)_{r_n} \right) dP - \beta \int_{\{\Sigma_n(X_n)_{r_n} > M\}} \left( \sum_n (X_n)_{r_n} - M \right) dP \quad (11)$$

$$\alpha = a_1 + a_2 > \beta = a_4 - a_3 > 0 \quad (12)$$

Here, an example of the expressions of the above-described first to third constraint conditions will be described. Inverter capacities of L energy storage apparatuses 30 are assumed to be $W^l \geq 0$, and power storage capacities thereof are assumed to be $S^l \geq 0$. A remaining amount of energy (energy stored at the point in time) immediately before the suppression time slot is assumed to be $S_0^l \geq 0$. In addition, a planned amount (based on the storage schedule) of power for charging the energy storage apparatus 30 of l (a serial number of the energy storage apparatus 30) in the unit time slot t is represented by $y_t^l$.

The first constraint condition is expressed by the following Expression (13).

$$0 \leq r_t \leq M_t + y_t \quad (13)$$

The second constraint condition is expressed by the following Expression (14).

$$S_0^l + \sum_{t=1}^T y_t^l \leq S^l, \forall l \leq L \quad (14)$$

The third constraint condition is expressed by the following Expression (15).

$$y_t^l \leq \delta^{W_t^l}, \forall t \leq T, \forall l \leq L \quad (15)$$

Referring back to FIG. 3, the communication unit 12 communicates with an external apparatus through a communication network, such as the Internet, which is configured in a wired and/or wireless manner.

For example, the communication unit 12 transmits the storage schedule decided by the decision unit 11 to a storage control apparatus that controls the operation of the energy storage apparatus 30, before the suppression time slot. The communication unit 12 transmits the storage schedule corresponding to the energy storage apparatus 30 controlled by each storage control apparatus to each of the plurality of storage control apparatuses.

In addition, the communication unit 12 transmits the output upper limit (W) decided by the decision unit 11 to a power generation control apparatus that controls the operation of the power generation apparatus 20 before the suppression time slot. The communication unit 12 transmits the output upper limit (W) corresponding to the power generation apparatus 20 controlled by each power generation control apparatus to each of the plurality of power generation control apparatuses.

Figure 8:
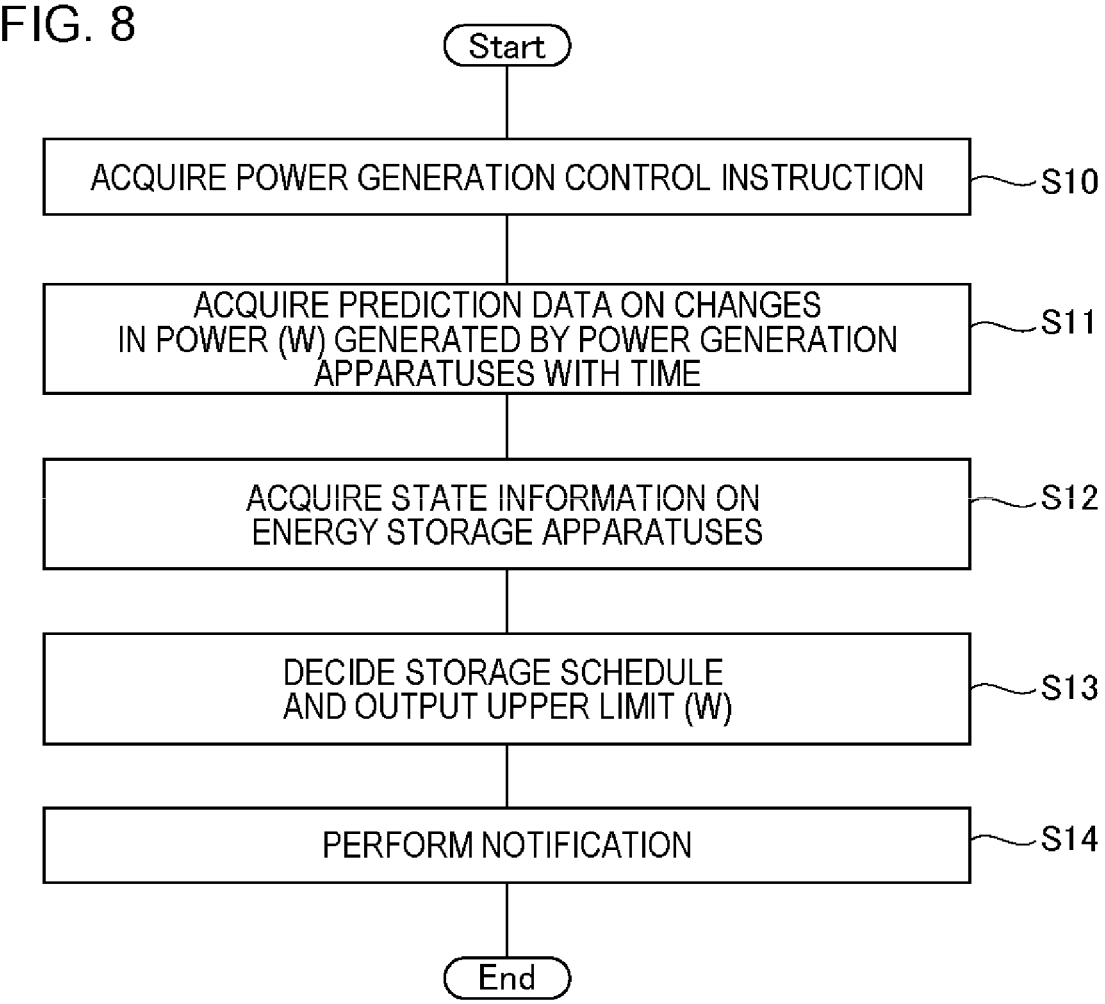
FIG. 8 is a flowchart illustrating an example of a flow of processing of the power control apparatus according to the present example embodiment.

Next, an example of a flow of the processing of the power control apparatus 10 according to the present example embodiment will be described with reference to a flowchart of FIG. 8.

First, the power control apparatus 10 receives a power generation control instruction for the plurality of power generation apparatuses 20 to be managed (S10).

Thereafter, the power control apparatus 10 acquires the prediction data on changes in power (W), which is generated by each of the plurality of power generation apparatuses 20 to be managed, with time in the suppression time indicated by the power generation control instruction (S11). The power control apparatus 10 may generate the prediction data by its own apparatus, or may acquire the prediction data from an external apparatus. The prediction data is generated on the basis of attribute information (for example, weather forecast) on the suppression time slot. A means of generating the prediction data is a matter of design.

In addition, the power control apparatus 10 acquires state information (for example, SOC, free capacity, and the like) on each of the plurality of energy storage apparatuses 30 to be managed, before (for example, an hour before, 30 minutes before, or 15 minutes before) the suppression time slot indicated by the power generation control instruction (S12).

The decision unit 11 decides an optimal solution for maximizing an objective function given in advance, that is, a storage schedule of each of the plurality of energy storage apparatuses 30 and an output upper limit (W) of each of the plurality of power generation apparatuses 20, on the basis of various information acquired in S10 to S12, the objective function, and values (a1 to a4) of various types of power (S13).

Thereafter, the decision unit 11 notifies the storage control apparatus controlling the operation of the energy storage apparatus 30 of the storage schedule decided in S13, before the suppression time slot (S14). In addition, the decision unit 11 notifies the power generation control apparatus controlling the operation of the power generation apparatus 20 of the output upper limit (W) decided in S13, before the suppression time slot (S14).

Thereafter, each of the plurality of energy storage apparatuses 30 stores energy during the suppression time slot, in accordance with the storage schedule decided in S13. In addition, each of the plurality of power generation apparatuses 20 performs power generation and output so as not to exceed the output upper limit (W) decided in S13.

Next, a configuration of the energy storage apparatus 30 will be described with reference to a functional block diagram of FIG. 9. Note that a communication line is indicated by a solid line, and a power line is indicated by a dotted line in the drawing. The energy storage apparatus 30 includes a storage control apparatus 31 and a storage unit 33.

The storage unit 33 is configured to receive the supply of power and store the received power as predetermined energy (for example, power or heat). The storage control apparatus 31 acquires a storage schedule decided by the power control apparatus 10. For example, the storage control apparatus 31 receives the storage schedule from the power control apparatus 10. The storage control apparatus 31 controls the operation of the storage unit 33 in accordance with the storage schedule. That is, when the storage control apparatus 31 receives the storage schedule, the storage control apparatus controls the storage unit 33 so as to be operated in accordance with the storage schedule (in which changes in power (W) to be stored in the energy storage apparatus 30 with time are determined).

The storage control apparatus 31 and the storage unit 33 may be configured to be physically and/or logically integrated with each other, or may be configured to be physically and/or logically separated from each other.

Next, a configuration of the power generation apparatus 20 will be described with reference to a functional block diagram of FIG. 2. The power generation apparatus 20 includes a power generation unit 23 and a power generation control apparatus 24.

The power generation unit 23 includes a power generation element 25 and a power conditioner 26. The power generation element 25 is a solar cell panel or the like, and generates power by using natural energy. The power conditioner 26 adjusts power to be supplied to the power system 40 from the power generation element 25 under the control of the power generation control apparatus 24.

The power generation control apparatus 24 acquires pieces of information indicating the output upper limit (W) decided by the power control apparatus 10 and the suppression time slot. For example, the power generation control apparatus 24 receives the pieces of information from the power control apparatus 10. The power generation control apparatus 24 controls the power conditioner 26 so as not to supply power to the power system 40 beyond the output upper limit (W) during the suppression time slot.

The power generation unit 23 and the power generation control apparatus 24 may be configured to be physically and/or logically integrated with each other, or may be configured to be physically and/or logically separated from each other.

Figure 9:
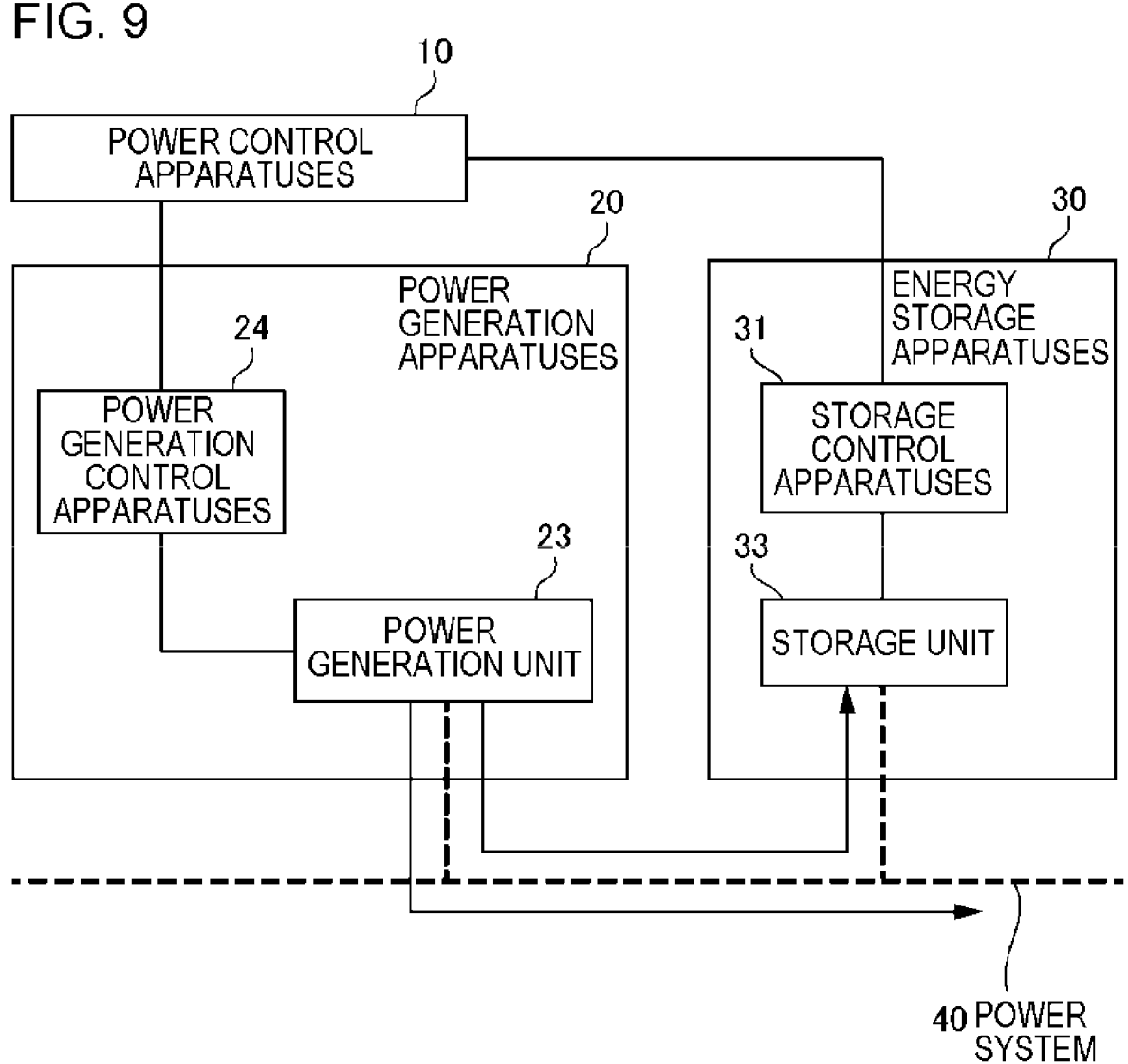
FIG. 9 is an example of a functional block diagram illustrating the whole image of the power control system according to the present example embodiment.

In a case of the example of FIG. 9, each of the power generation apparatus 20 and the energy storage apparatus 30 is connected to the power system 40. That is, the power generation apparatus 20 and the energy storage apparatus 30 are connected to each other through the power system 40. However, connection between the power generation apparatus 20 and the energy storage apparatus 30 through a dedicated line or the like other than the power system 40 is not performed.

In a case of the example, power generated by the power generation apparatus 20 with the output upper limit (W) as an upper limit is supplied to the power system 40. The energy storage apparatus 30 receives the supply of power from the power system 40 in accordance with the storage schedule, and stores energy.

Figure 10:
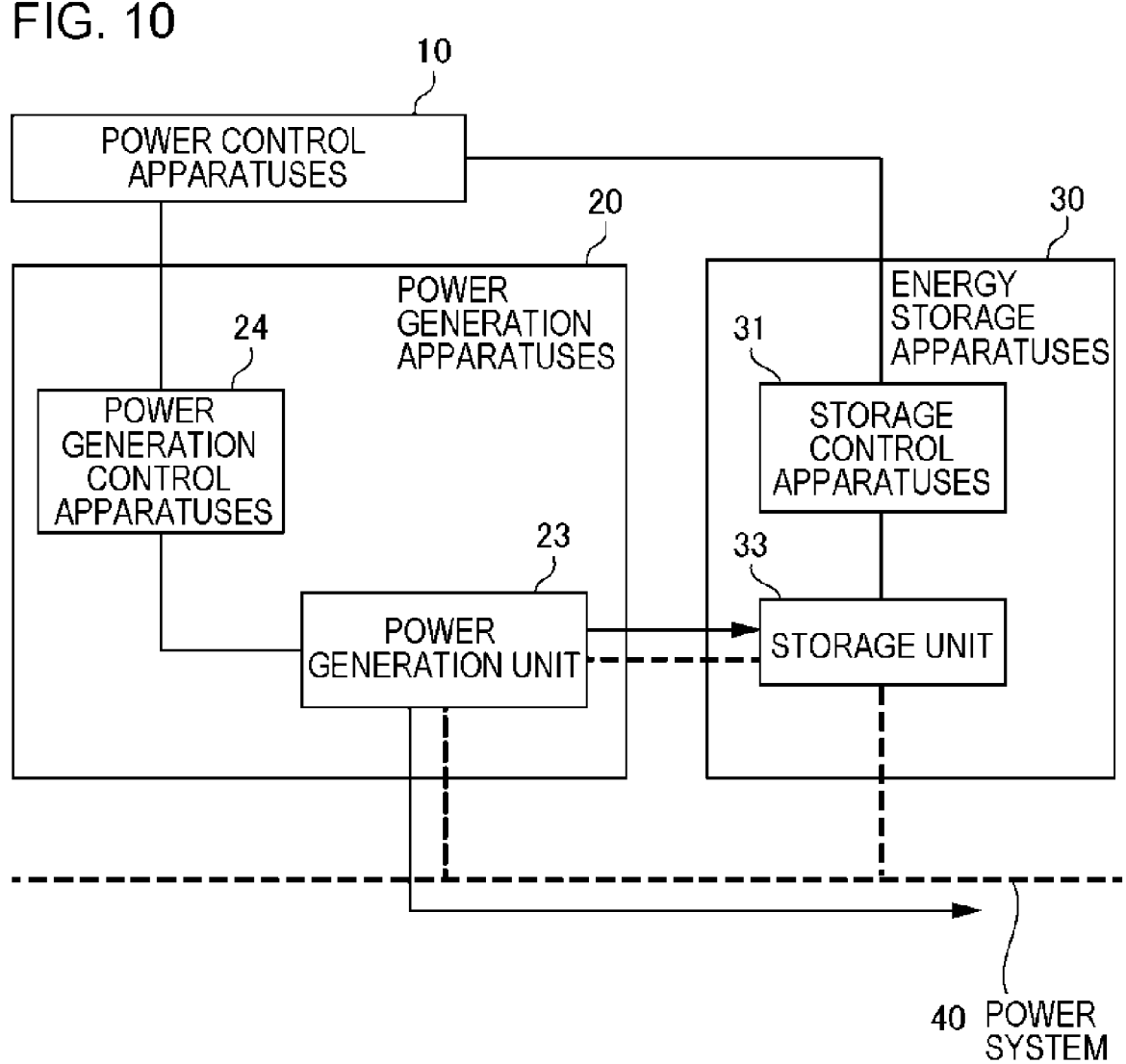
FIG. 10 is an example of a functional block diagram illustrating the whole image of the power control system according to the present example embodiment.

As another example, as illustrated in FIG. 10, the power generation apparatus 20 and the energy storage apparatus 30 may be connected to each other through a dedicated line or the like other than the power system 40. For example, a case or the like is considered in which a certain company or person holds both the power generation apparatus 20 and the energy storage apparatus 30, connects the apparatuses to each other through a dedicated power line different from the power system 40, and registers both the apparatuses in the power control apparatus 10 as objects to be managed. In this case, the power generation apparatus 20 may directly supply generated power to the energy storage apparatus 30 without going through the power system 40.

According to the present example embodiment described above, it is possible to decide a storage schedule of each of the plurality of energy storage apparatuses 30 and an output upper limit (W) of each of the power generation apparatuses 20 before a suppression time slot. The energy storage apparatus 30 may perform energy storage processing based on the storage schedule during the suppression time slot. In addition, the power generation apparatus 20 may control power generation so as not to exceed the output upper limit (W).

Thus, the control of the power generation apparatus 20 and the energy storage apparatus 30 in the suppression time slot is relatively facilitated. That is, it is possible to avoid troublesome control, such as the adjustment of operation of the power generation apparatus 20 and the energy storage apparatus 30, so as to be suitable for fluctuations in the state of the natural environment (for example, sunlight or wind).

In a case of the present example embodiment, it is possible to decide a storage schedule and an output upper limit (W) such that the total value of various types of power classified in accordance with attributes is maximized. The values of various types of power are appropriately set, and thus it is possible to set a balance of various types of power in a suppression time slot (a balance of power (W) or the amount of power (Wh) in the entire suppression time slot) to be in a desired state.

For example, in the model illustrated in FIG. 6, in a case where it is desired that the storage of power, other than power generated by the power generation apparatus 20, in the energy storage apparatus 30 is reduced while reducing the suppression of power generation, that is, in a case where it is desired that the power of the third group (equivalent to (iii) in the drawing) and the fourth group (equivalent to (iv) in the drawing) is reduced while increasing the power of the first group (equivalent to (i) in the drawing) and the second group (equivalent to (ii) in the drawing), for example, the values a1 to a3 of the first to third groups may be set to be positive values and the value a4 of the fourth group may be set to be a negative value. Note that the evaluation value $V = M1 \times a1 + M2 \times a2 - M3 \times a3 + M4 \times a4$ is represented, and the value of the third group is evaluated as a minus value. Accordingly, the value a3 may be a positive value.

In a case of the present example embodiment, the decision of a storage schedule and an output upper limit (W) taking the state (SOC or the like) of the energy storage apparatus 30 into consideration is realized in accordance with constraint conditions. Thus, it is possible to decide the storage schedule in which energy is stored in the energy storage apparatus 30 within a range in which energy can be absorbed into the energy storage apparatus 30. It is possible to decide the output upper limit (W) on the basis of an output upper limit instruction value (W) notified from an electricity company and the storage schedule. Thus, it is possible to contribute to the stabilization of the power system 40.

In the present example embodiment, it is possible to use data on a predicted probability distribution of generated power (W) at each point in time, as prediction data on changes in the power (W) generated by the power generation apparatus 20 with time. It is possible to sufficiently consider the risk of losing a gain (the risk of reducing the total value of various types of power) due to the uncertainty (weather dependence) of the power generation apparatus 20 by using the data.

Second Example Embodiment

Figure 11:
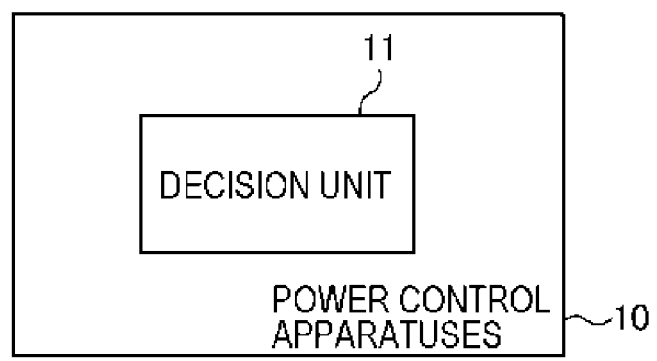
FIG. 11 is an example of a functional block diagram of the power control apparatus according to the present example embodiment.

FIG. 11 illustrates an example of a functional block diagram of a power control apparatus 10 according to the present example embodiment. The power control apparatus 10 according to the present example embodiment is different from the power control apparatus 10 according to the first example embodiment in that a communication unit 12 transmitting a storage schedule to a storage control apparatus and transmitting an output upper limit (W) to a power generation control apparatus is not provided. A configuration of a decision unit 11 is the same as that in the first example embodiment.

In a case of the present example embodiment, a storage schedule and an output upper limit (W) are notified to each of storage control apparatuses and power generation control apparatuses by a unit different from that in the first example embodiment. For example, an external apparatus logically separated from the power control apparatus 10 may include a communication unit 12. A storage schedule and an output upper limit (W) determined by the decision unit 11 may be input to the external apparatus by any unit. The communication unit 12 of the external apparatus transmits the storage schedule and the output upper limit (W) to each of the storage control apparatuses and power generation control apparatuses.

According to the present example embodiment, it is possible to realize the same advantageous effects as those in the first example embodiment.

Third Example Embodiment

A decision unit 11 according to the present example embodiment decides a storage schedule on the basis of the accuracy of prediction data (prediction data on changes in power (W) generated by a power generation apparatus 20 with time within a predetermined period of time). For example, the decision unit 11 can set a2 (/Wh) such that an objective function regarding a gain is maximized or an objective function regarding a loss is minimized, on the basis of the accuracy of the prediction data.

Figure 13:
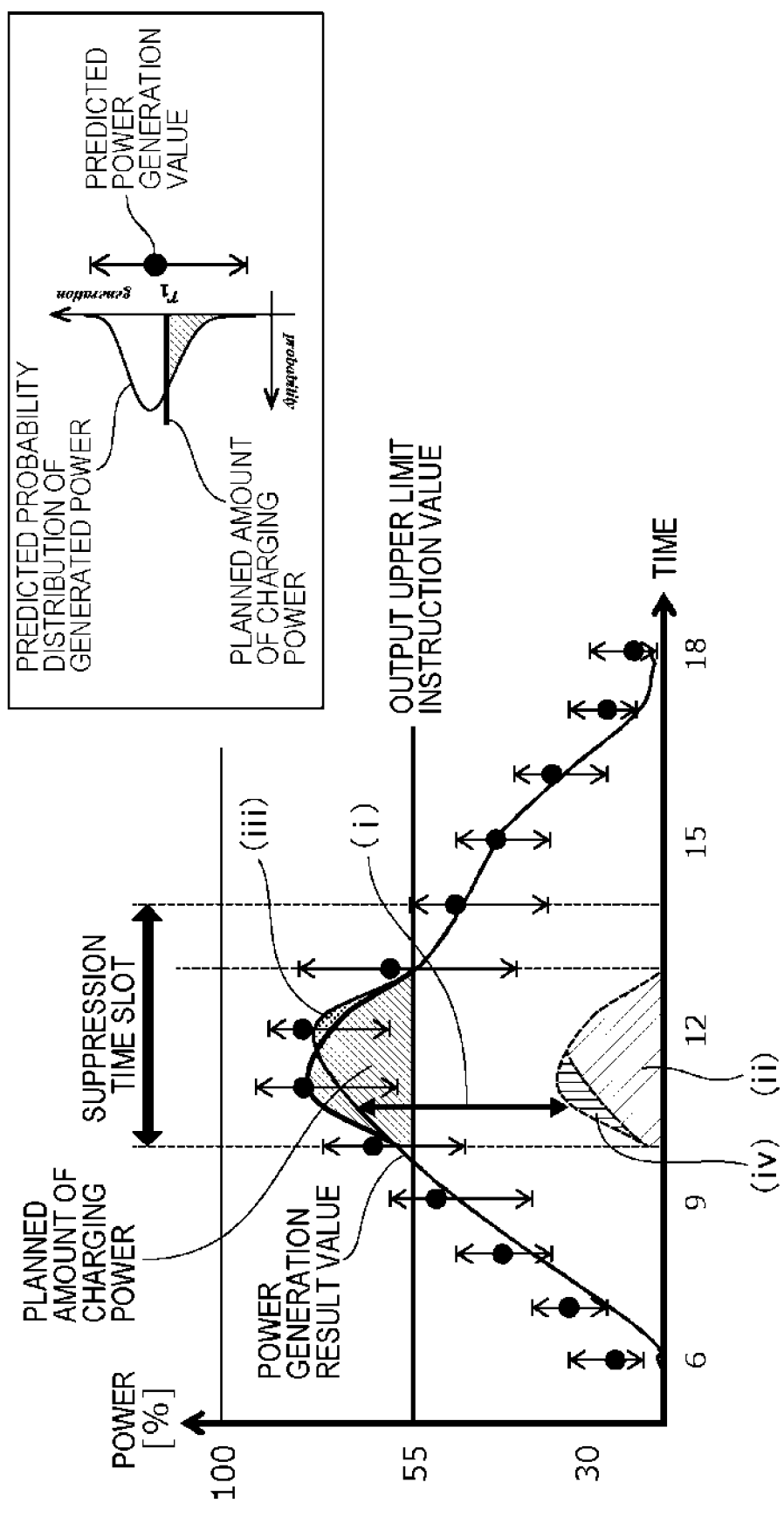
FIG. 13 is a diagram illustrating processing contents of the power control apparatus according to the present example embodiment.

The prediction data on changes in the power (W) generated by the power generation apparatus 20 is given as data on a predicted probability distribution of the generated power (W) at each point in time. FIG. 13 illustrates an example. In the drawing, a predicted probability distribution of the generated power (W) is shown in response to each timing. That is, the predicted power generation value (black circle) and a numerical range (a range indicated by upward and downward arrows) in which the predicted power generation value may deviate are shown in response to each timing. Further, as illustrated in the upper right drawing, a predicted probability distribution within the numerical range is shown. Note that hourly data is illustrated in the drawing, but is not limited thereto.

The decision unit 11 determines that the accuracy is relatively low at a timing when the numerical range of the prediction value is wide (for example, a case where a difference between 90th percentiles of the probability distribution and the prediction value is equal to or greater than 50% at a prediction value ratio), and the accuracy is relatively high at a timing when the numerical range of the prediction value is narrow (for example, a case where a difference between 90th percentiles of the probability distribution and the prediction value is less than 50% at a prediction value ratio). Note that a criterion for determining the level of the accuracy of prediction is not limited thereto, and the accuracy may be achieved according to other criteria for determination.

A power control apparatus 10 increases M2 (Wh), corresponding to an amount of power exceeding an output upper limit instruction value (W) in the generated power (W), which is the amount of second power (W) to be stored in an energy storage apparatus 30, so as to increase a gain by increasing an income received by storing the power in the energy storage apparatus 30.

On the other hand, the power control apparatus 10 reduces M4 (Wh), which is the amount of fourth power (W) corresponding an amount obtained by subtracting the second power (W) from the power (W) stored in the energy storage apparatus, so as to reduce an outgo (the case of the model illustrated in FIG. 6) which results from the purchase of power from a power company or a loss (the case of the model illustrated in FIG. 7) which occurs due to a decrease in a charge for electric power sold to an electricity company.

Figure 12:
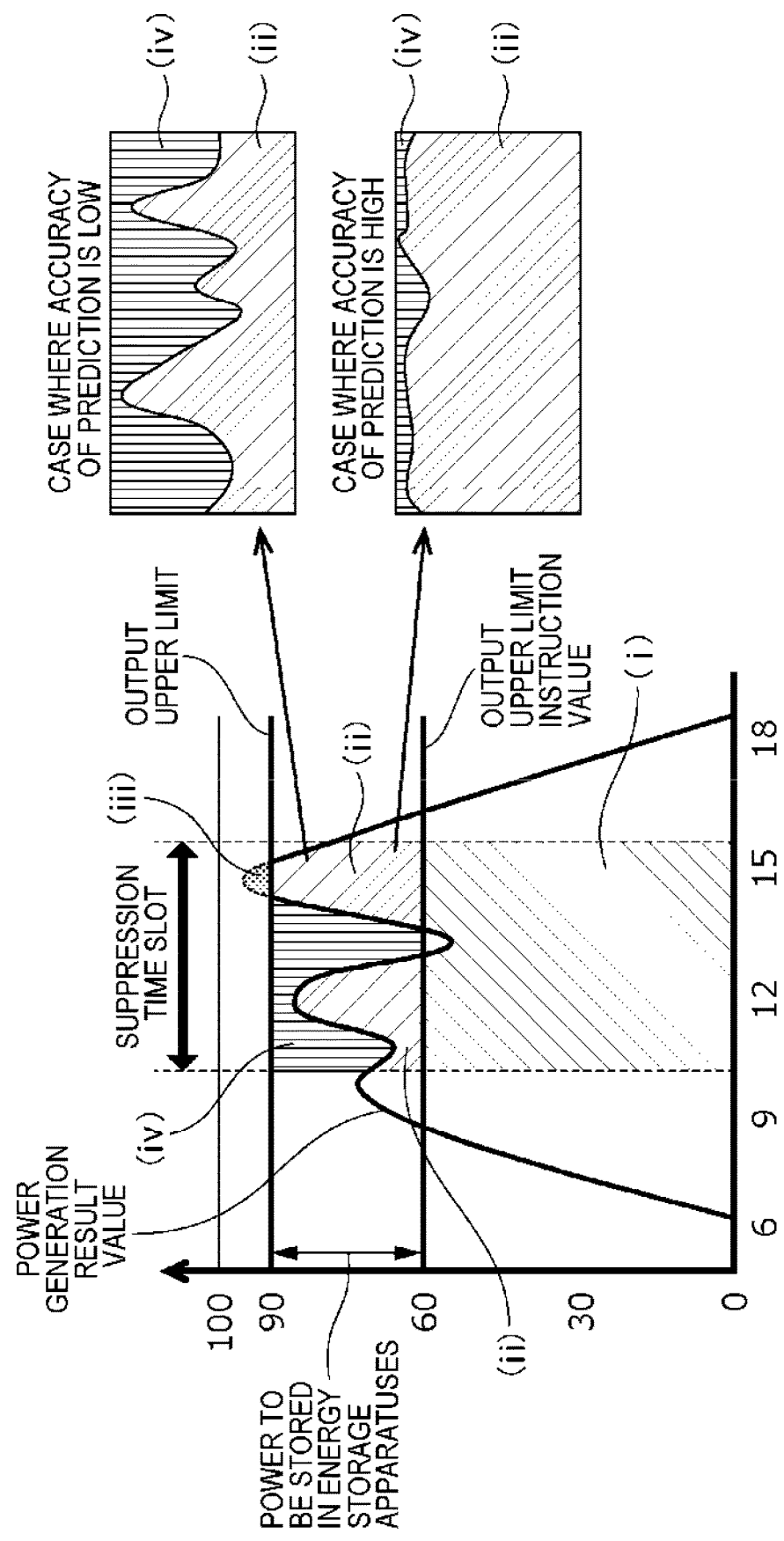
FIG. 12 is a diagram illustrating processing contents of the power control apparatus according to the present example embodiment.

Here, FIG. 12 illustrates a conceptual diagram regarding how the amount of power of each of second and fourth groups may change in a case where the accuracy of prediction of power generation is high and a case where the accuracy is low. As illustrated in FIG. 12, in a case where the accuracy of prediction of prediction data on changes in the power (W) generated by the power generation apparatus 20 with time within the predetermined period of time is low, the proportion of the fourth group in the power to be stored in the energy storage apparatus 30 is increased, and the proportion of the second group is decreased. That is, the second power exceeding the output upper limit instruction value (W) in the generated power (W) cannot be predicted with a high accuracy, and thus it is necessary to cover a deficit with the fourth power.

In this case, it is possible to reduce the amount of power (M4) of the fourth power which is the fourth group by reducing power (W) to be stored in the energy storage apparatus 30. As a result, it is possible to reduce an outgo (the case of the model illustrated in FIG. 6) which results from the purchase of power from a power company or a loss (the case of the model illustrated in FIG. 7) which occurs due to a decrease in a charge for electric power sold to an electricity company.

In addition, the value a2 (/Wh) of the power of the second group in the power (W) stored in the energy storage apparatus 30 may be increased. That is, it is possible to increase a gain by increasing a price even when the proportion of the second power is low.

On the other hand, as illustrated in FIG. 12, in a case where the accuracy of prediction of prediction data on changes in the power (W) generated by the power generation apparatus 20 with time within the predetermined period of time is high, the proportion of the fourth group in the power to be stored in the energy storage apparatus 30 is decreased, and the proportion of the second group is increased. That is, the second power exceeding the output upper limit instruction value (W) in the generated power (W) can be predicted with a high accuracy, and thus it is possible to reduce the fourth power.

In this case, the proportion of the amount of power (M2) of the second power which is the second group is increased by increasing power (W) to be stored in the energy storage apparatus 30, and thus it is possible to increase a gain.

In addition, the value a2 (/Wh) of the power of the second group in the power (W) stored in the energy storage apparatus 30 may be lowered. That is, the proportion of the power of the second group is high even when the price of the power of the second group is lowered, and thus it is possible to increase a gain as a whole.

The other configurations of the power control apparatus 10 are the same as those in the first and second example embodiments.

Hereinafter, an example of a reference configuration will be appended.

1. A power control apparatus that stores an amount of power exceeding an output upper limit instruction value (W), which is determined by an electricity company in power (W) generated by a power generation apparatus, in an energy storage apparatus, the power control apparatus including:

a decision unit that decides a storage schedule in which changes in the power (W) to be stored in the energy storage apparatus with time within a predetermined period of time are determined, on the basis of prediction data on changes in the power (W) generated by the power generation apparatus with time within the predetermined period of time and values of various types of power classified on the basis of the output upper limit instruction value (W) within the predetermined period of time.

2. The power control apparatus according to 1,
wherein the decision unit further decides an output upper limit (W) of the power generation apparatus within the predetermined period of time.

3. The power control apparatus according to 1 or 2,
wherein the decision unit decides the storage schedule such that an objective function regarding a gain, which is defined using the prediction data, the output upper limit instruction value (W), the values of the various types of power, the storage schedule, and the output upper limit (W), is maximized or an objective function regarding a loss is minimized.

4. The power control apparatus according to any one of 1 to 3,
wherein the decision unit decides the storage schedule and the output upper limit (W) such that an evaluation value V=M1×a1+M2×a2−M3×a3+M4×a4 satisfies predetermined conditions, when an amount of first power (W) sold to an electricity company with the output upper limit instruction value (W) as an upper limit, in the power (W) generated by the power generation apparatus within the predetermined period of time, is set to be M1 (Wh), a value thereof is set to be a1 (/Wh), an amount of second power (W), corresponding to an amount of power exceeding the output upper limit instruction value (W) in the generated power (W), which is to be stored in the energy storage apparatus is set to be M2 (Wh), a value thereof is set to be a2 (/Wh), an amount of third power (W), corresponding to an amount of power exceeding the output upper limit (W), of which generation is suppressed within the predetermined period of time is set to be M3 (Wh), a value thereof is set to be a3 (/Wh), an amount of fourth power (W), corresponding to an amount obtained by subtracting the second power (W) from the power (W) to be stored in the energy storage apparatus within the predetermined period of time on the basis of the storage schedule, is set to be M4 (Wh), and a value thereof is set to be a4 (/Wh).

5. The power control apparatus according to 4,
wherein the second power (W) is power (W) of which generation is supposed to be suppressed, in the power (W) to be stored in the energy storage apparatus within the predetermined period of time on the basis of the storage schedule, in a case where there is no process of storing the amount of power exceeding the output upper limit instruction value (W) in the energy storage apparatus.

6. The power control apparatus according to 4 or 5,
wherein the decision unit decides the storage schedule and the output upper limit (W) such that the evaluation value V is maximized.

7. The power control apparatus according to 6,
wherein the decision unit obtains the storage schedule for maximizing an objective function by using the evaluation value V as the objective function.

8. The power control apparatus according to any one of 1 to 7,
wherein the decision unit decides the storage schedule such that a sum of the output upper limit instruction value (W) and the power (W) to be stored in the energy storage apparatus on the basis of the storage schedule is set to be equal to or less than the output upper limit (W).

9. The power control apparatus according to any one of 1 to 8,
wherein the decision unit decides the storage schedule such that an amount of power (Wh) to be stored in the energy storage apparatus within the predetermined period of time on the basis of the storage schedule is set to be equal to or less than an amount of power (Wh) which can be stored in the energy storage apparatus within the predetermined period of time which is determined on the basis of state information on the energy storage apparatus.

10. The power control apparatus according to any one of 1 to 9,
wherein the decision unit decides the storage schedule such that the power (W) to be stored in the energy storage apparatus within the predetermined period of time on the basis of the storage schedule is set to be equal to or less than the power (W) which can be stored in the energy storage apparatus within the predetermined period of time which is determined on the basis of the state information on the energy storage apparatus.

11. The power control apparatus according to any one of 1 to 10,
wherein the decision unit decides the storage schedule by using data on a predicted probability distribution of generated power (W) at each point in time as the prediction data on the changes in the power (W) generated by the power generation apparatus with time within the predetermined period of time.

12. The power control apparatus according to any one of 1 to 10,
wherein the decision unit decides the storage schedule on the basis of the prediction data on the changes in the generated power (W) with time within a range of the predicted probability distribution of the generated power (W) at each point in time.

13. The power control apparatus according to any one of 1 to 12,
wherein the decision unit decides the storage schedule of each of a plurality of energy storage apparatuses in order to store an amount exceeding a total of the output upper limit instruction values (W) of a plurality of power generation apparatuses which are determined by the electricity company in a total of power (W) generated by the plurality of power generation apparatuses, in the plurality of energy storage apparatuses.

14. The power control apparatus according to any one of 1 to 13, further including:
a communication unit that transmits the storage schedule decided by the decision unit to a storage control apparatus that controls operation of the energy storage apparatus, and transmits the output upper limit (W) decided by the decision unit to a power generation control apparatus that controls operation of the power generation apparatus.

15. The power control apparatus according to 14,
wherein the decision unit sets the a2 (/Wh) such that an objective function regarding a gain is maximized or an objective function regarding a loss is minimized, on the basis of accuracy of the prediction data.

16. The power control apparatus according to any one of 1 to 15,
wherein the decision unit decides the storage schedule on the basis of the accuracy of the prediction data.

17. The power control apparatus according to 16,
wherein the decision unit increases the power (W) to be stored in the energy storage apparatus within the predetermined period of time as the accuracy of the prediction data becomes higher.

18. The power control apparatus according to 16 dependent on 4,
wherein the decision unit lowers the a2 (/Wh) as the accuracy of the prediction data becomes higher.

19. The power control apparatus according to 16,
wherein the decision unit reduces the power (W) to be stored in the energy storage apparatus within the predetermined period of time as the accuracy of the prediction data becomes lower.

20. The power control apparatus according to 16,
wherein the decision unit increases the a2 (/Wh) as the accuracy of the prediction data becomes lower.

21. A power control system including:
the power control apparatus according to any one of 1 to 20;
a storage control apparatus that controls operation of an energy storage apparatus on the basis of a storage schedule in which changes in power (W) to be stored in the energy storage apparatus with time within a predetermined period of time are determined, which is decided by the power control apparatus; and
a power generation control apparatus that controls operation of a power generation apparatus on the basis of an output upper limit (W) of the power generation apparatus within the predetermined period of time, which is decided by the power control apparatus.

22. A power control method executed by a computer of a power generation control apparatus, the power generation control apparatus storing in an energy storage apparatus an amount of power exceeding an output upper limit instruction value (W), which is determined by an electricity company in power (W) generated by a power generation apparatus, the method including:
a decision step of deciding a storage schedule in which changes in the power (W) to be stored in the energy storage apparatus with time within a predetermined period of time are determined, on the basis of prediction data on changes in the power (W) generated by the power generation apparatus with time within the predetermined period of time and values of various types of power classified on the basis of the output upper limit instruction value (W) within the predetermined period of time.

23. A program causing a computer of a power control apparatus storing in an energy storage apparatus an amount of power exceeding an output upper limit instruction value (W), which is determined by an electricity company in power (W) generated by a power generation apparatus to function as:
a decision unit that decides a storage schedule in which changes in the power (W) to be stored in the energy storage apparatus with time within a predetermined period of time are determined, on the basis of prediction data on changes in the power (W) generated by the power generation apparatus with time within the predetermined period of time and values of various types of power classified on the basis of the output upper limit instruction value (W) within the predetermined period of time.

The invention claimed is:

1. A power control apparatus that stores an amount of power exceeding an output upper limit instruction value (W), which is determined by an electricity company in power (W) generated by a power generation apparatus, in an energy storage apparatus, the power control apparatus comprising:
at least one memory storing one or more instructions; and
at least one processor configured to execute the one or more instructions to:
decide a storage schedule in which changes in the power (W) to be stored in the energy storage apparatus with time within a predetermined period of time are determined, on the basis of the presence or absence of generation, generated amounts of power, and values of various types of power, the various types of power being classified on the basis of prediction data on changes in the power (W) generated by the power generation apparatus with time within the predetermined period of time, the output upper limit instruction value (W) within the predetermined period of time, the storage schedule in which changes in the power (W) to be stored in the energy storage apparatus with time within the predetermined period of time are determined, an output upper limit (W) of the power generation apparatus within the predetermined period of time,
wherein the various types of power comprise:
first power (W), corresponding to power not exceeding the output upper limit instruction value (W) in the power (W) generated by the power generation apparatus within the predetermined period of time;
third power (W), corresponding to power exceeding the output upper limit (W) in the power (W) generated by the power generation apparatus within the predetermined period of time;
second power (W), corresponding to power obtained by subtracting the third power (W) from power exceeding the output upper limit instruction value (W) in the power (W) generated by the power generation apparatus within the predetermined period of time; and
fourth power (W), corresponding to power obtained by subtracting the second power (W) from the power (W) to be stored in the energy storage apparatus on the basis of the storage schedule.

2. The power control apparatus according to claim 1, wherein the at least one processor is further configured to decide the storage schedule by optimizing an objective function, the objective function being defined using the prediction data, the output upper limit instruction value (W), the values of the various types of power, the storage schedule, and the output upper limit (W), the objective function being maximized when the objective function relates to a gain, and the objective function being minimized when the objective function relates to a loss.

3. The power control apparatus according to claim 1, wherein the at least one processor is further configured to decide the storage schedule and the output upper limit (W) such that an evaluation value V=M1× a1+M2× a2−M3× a3+M4× a4 satisfies predetermined conditions, when an amount of first power is set to be M1 (Wh), a value thereof is set to be a1 (/Wh), an amount of second power is set to be M2 (Wh), a value thereof is set to be a2 (/Wh), an amount of third power is set to be M3 (Wh), a value thereof is set to be a3 (/Wh), an amount of fourth power is set to be M4 (Wh), and a value thereof is set to be a4 (/Wh).

4. The power control apparatus according to claim 3, wherein the second power (W) is power (W) of which generation is supposed to be suppressed, in the power (W) to be stored in the energy storage apparatus within the predetermined period of time on the basis of the storage schedule, in a case where there is no process of storing an amount of power exceeding the output upper limit instruction value (W) in the energy storage apparatus.

5. The power control apparatus according to claim 3, wherein the at least one processor is further configured to decide the storage schedule and the output upper limit (W) such that the evaluation value V is maximized.

6. The power control apparatus according to claim 5, wherein the at least one processor is further configured to obtain the storage schedule for maximizing an objective function by using the evaluation value V as the objective function.

7. The power control apparatus according to claim 1, wherein the at least one processor is further configured to decide the storage schedule such that a sum of the output upper limit instruction value (W) and the power (W) to be stored in the energy storage apparatus on the basis of the storage schedule is set to be equal to or less than the output upper limit (W) of the power generation apparatus within the predetermined period of time.

8. The power control apparatus according to claim 1, wherein the at least one processor is further configured to decide the storage schedule such that an amount of power (Wh) to be stored in the energy storage apparatus within the predetermined period of time on the basis of the storage schedule is set to be equal to or less than an amount of power (Wh) which can be stored in the energy storage apparatus within the predetermined period of time which is determined on the basis of state information on the energy storage apparatus.

9. The power control apparatus according to claim 1, wherein the at least one processor is further configured to decide the storage schedule such that the power (W) to be stored in the energy storage apparatus within the predetermined period of time on the basis of the storage schedule is set to be equal to or less than the power (W) which can be stored in the energy storage apparatus within the predetermined period of time which is determined on the basis of the state information on the energy storage apparatus.

10. The power control apparatus according to claim 1, wherein the at least one processor is further configured to decide the storage schedule by using data on a predicted probability distribution of generated power (W) at each point in time as the prediction data on the changes in the power (W) generated by the power generation apparatus with time within the predetermined period of time.

11. The power control apparatus according to claim 1, wherein the at least one processor is further configured to decide the storage schedule on the basis of the prediction data on the changes in the generated power (W) with time within a range of the predicted probability distribution of the generated power (W) at each point in time.

12. The power control apparatus according to claim 1, wherein the at least one processor is further configured to decide the storage schedule of each of a plurality of energy storage apparatuses in order to store an amount exceeding a total of the output upper limit instruction values (W) of a plurality of power generation apparatuses which are determined by the electricity company in a total of power (W) generated by the plurality of power generation apparatuses, in the plurality of energy storage apparatuses.

13. The power control apparatus according to claim 1, wherein the at least one processor is further configured to:

transmit the storage schedule to a storage control apparatus that controls operation of the energy storage apparatus, and transmit the output upper limit (W) to a power generation control apparatus that controls operation of the power generation apparatus.

14. The power control apparatus according to claim 1, wherein the at least one processor is further configured to increase the power (W) to be stored in the energy storage apparatus within the predetermined period of time as an accuracy of the prediction data increases, the accuracy of the prediction data being a measure of how well the prediction data matches actual changes in the power (W).

15. The power control apparatus according to claim 3, wherein the at least one processor is further configured to lower the a2 (/Wh) as an accuracy of the prediction data increases, the accuracy of the prediction data being a measure of how well the prediction data matches actual changes in the power (W).

16. The power control apparatus according to claim 1, wherein the at least one processor is further configured to reduce the power (W) to be stored in the energy storage apparatus within the predetermined period of time as an accuracy of the prediction data decreases, the accuracy of the prediction data being a measure of how well the prediction data matches actual changes in the power (W).

17. The power control apparatus according to claim 3, wherein the at least one processor is further configured to increase the a2 (/Wh) as an accuracy of the prediction data decreases, the accuracy of the prediction data being a measure of how well the prediction data matches actual changes in the power (W).

18. A power control system comprising:
the power control apparatus according to claim 1;
a storage control apparatus comprising:
at least one memory storing one or more instructions; and
at least one processor configured to execute the one or more instructions to:
control operation of an energy storage apparatus on the basis of a storage schedule in which changes in power (W) to be stored in the energy storage apparatus with time within a predetermined period of time are determined, which is decided by the power control apparatus; and
a power generation control apparatus comprising:
at least one memory storing one or more instructions; and
at least one processor configured to execute the one or more instructions to:
control operation of a power generation apparatus on the basis of an output upper limit (W) of the power generation apparatus within the predetermined period of time, which is decided by the power control apparatus.

19. A power control method executed by a computer of a power generation control apparatus, the power generation control apparatus storing in an energy storage apparatus an amount of power exceeding an output upper limit instruction value (W), which is determined by an electricity company in power (W) generated by a power generation apparatus, the method comprising:
deciding a storage schedule in which changes in the power (W) to be stored in the energy storage apparatus with time within a predetermined period of time are determined, on the basis of the presence or absence of generation, generated amounts of power, and values of various types of power, the various types of power being classified on the basis of prediction data on changes in the power (W) generated by the power generation apparatus with time within the predetermined period of time, the output upper limit instruction value (W) within the predetermined period of time, the storage schedule in which changes in the power (W) to be stored in the energy storage apparatus with time within the predetermined period of time are determined, an output upper limit (W) of the power generation apparatus within the predetermined period of time,
wherein the various types of power comprise:
first power (W), corresponding to power not exceeding the output upper limit instruction value (W) in the power (W) generated by the power generation apparatus within the predetermined period of time;
third power (W), corresponding to power exceeding the output upper limit (W) in the power (W) generated by the power generation apparatus within the predetermined period of time;
second power (W), corresponding to power obtained by subtracting the third power (W) from power exceeding the output upper limit instruction value (W) in the power (W) generated by the power generation apparatus within the predetermined period of time; and
fourth power (W), corresponding to power obtained by subtracting the second power (W) from the power (W) to be stored in the energy storage apparatus on the basis of the storage schedule.

20. A power control apparatus that stores an amount of power exceeding an output upper limit instruction value (W), which is determined by an electricity company in power (W) generated by a power generation apparatus, in an energy storage apparatus, the power control apparatus comprising:
at least one memory storing one or more instructions; and
at least one processor configured to execute the one or more instructions to:
decide a storage schedule in which changes in the power (W) to be stored in the energy storage apparatus with time within a predetermined period of time are determined, on the basis of values of various types of power, the various types of power being classified on the basis of prediction data on changes in the power (W) generated by the power generation apparatus with time within the predetermined period of time, the output upper limit instruction value (W) within the predetermined period of time, the storage schedule in which changes in the power (W) to be stored in the energy storage apparatus with time within the predetermined period of time are determined, an output upper limit (W) of the power generation apparatus within the predetermined period of time,
wherein the various types of power comprise:
first power (W), corresponding to power not exceeding the output upper limit instruction value (W) in the power (W) generated by the power generation apparatus within the predetermined period of time;
third power (W), corresponding to power exceeding the output upper limit (W) in the power (W) generated by the power generation apparatus within the predetermined period of time;
second power (W), corresponding to power obtained by subtracting the third power (W) from power exceeding the output upper limit instruction value (W) in the power (W) generated by the power generation apparatus within the predetermined period of time; and
fourth power (W), corresponding to power obtained by subtracting the second power (W) from the power (W) to be stored in the energy storage apparatus on the basis of the storage schedule.

21. The power control apparatus according to claim 20, wherein the at least one processor is further configured to decide the storage schedule and the output upper limit (W) such that an evaluation value $V=M1\times a1+M2\times a2-M3\times a3+M4\times a4$ satisfies predetermined conditions, when an amount of first power is set to be M1 (Wh), a value thereof is set to be a1 (/Wh), an amount of second power is set to be M2 (Wh), a value thereof is set to be a2 (/Wh), an amount of third power is set to be M3 (Wh), a value thereof is set to be a3 (/Wh), an amount of fourth power is set to be M4 (Wh), and a value thereof is set to be a4 (/Wh).

22. A power control apparatus that stores an amount of power exceeding an output upper limit instruction value (W), which is determined by an electricity company in power (W) generated by a power generation apparatus, in an energy storage apparatus, the power control apparatus comprising:
at least one memory storing one or more instructions; and
at least one processor configured to execute the one or more instructions to:
decide a storage schedule in which changes in the power (W) to be stored in the energy storage apparatus with time within a predetermined period of time are determined, on the basis of the presence or absence of generation, generated amounts of power, and values of various types of power, the various types of power being classified on the basis of prediction data on changes in the power (W) generated by the power generation apparatus with time within the predetermined period of time, the output upper limit instruction value (W) within the predetermined period of time, the storage schedule in which changes in the power (W) to be stored in the energy storage apparatus with time within the predetermined period of time are determined, an output upper limit (W) of the power generation apparatus within the predetermined period of time, wherein the various types of power comprise:

third power (W), corresponding to power exceeding the output upper limit (W) in the power (W) generated by the power generation apparatus within the predetermined period of time;

first power (W), corresponding to power obtained by subtracting the power (W) to be stored in the energy storage apparatus on the basis of the storage schedule and the third power (W) from the power (W) generated by the power generation apparatus within the predetermined period of time;

fourth power (W), corresponding to power not exceeding the power (W) to be stored in the energy storage apparatus on the basis of the storage schedule in power obtained by subtracting the first power (W) from the output upper limit instruction value (W); and second power (W), corresponding to power obtained by subtracting the fourth power (W) from the power (W) to be stored in the energy storage apparatus on the basis of the storage schedule.

23. The power control apparatus according to claim 22, wherein the at least one processor is further configured to decide the storage schedule and the output upper limit (W) such that an evaluation value $V = M1 \times a1 + M2 \times a2 - M3 \times a3 + M4 \times a4$ satisfies predetermined conditions, when an amount of first power is set to be M1 (Wh), a value thereof is set to be a1 (/Wh), an amount of second power is set to be M2 (Wh), a value thereof is set to be a2 (/Wh), an amount of third power is set to be M3 (Wh), a value thereof is set to be a3 (/Wh), an amount of fourth power is set to be M4 (Wh), and a value thereof is set to be a4 (/Wh).

24. A power control apparatus that stores an amount of power exceeding an output upper limit instruction value (W), which is determined by an electricity company in power (W) generated by a power generation apparatus, in an energy storage apparatus, the power control apparatus comprising:

at least one memory storing one or more instructions; and at least one processor configured to execute the one or more instructions to:

decide a storage schedule in which changes in the power (W) to be stored in the energy storage apparatus with time within a predetermined period of time are determined, on the basis of values of various types of power, the various types of power being classified on the basis of prediction data on changes in the power (W) generated by the power generation apparatus with time within the predetermined period of time, the output upper limit instruction value (W) within the predetermined period of time, the storage schedule in which changes in the power (W) to be stored in the energy storage apparatus with time within the predetermined period of time are determined, an output upper limit (W) of the power generation apparatus within the predetermined period of time, wherein the various types of power comprise:

third power (W), corresponding to power exceeding the output upper limit (W) in the power (W) generated by the power generation apparatus within the predetermined period of time;

first power (W), corresponding to power obtained by subtracting the power (W) to be stored in the energy storage apparatus on the basis of the storage schedule and the third power (W) from the power (W) generated by the power generation apparatus within the predetermined period of time;

fourth power (W), corresponding to power not exceeding the power (W) to be stored in the energy storage apparatus on the basis of the storage schedule in power obtained by subtracting the first power (W) from the output upper limit instruction value (W); and second power (W), corresponding to power obtained by subtracting the fourth power (W) from the power (W) to be stored in the energy storage apparatus on the basis of the storage schedule.

25. The power control apparatus according to claim 24, wherein the at least one processor is further configured to decide the storage schedule and the output upper limit (W) such that an evaluation value $V = M1 \times a1 + M2 \times a2 - M3 \times a3 + M4 \times a4$ satisfies predetermined conditions, when an amount of first power is set to be M1 (Wh), a value thereof is set to be a1 (/Wh), an amount of second power is set to be M2 (Wh), a value thereof is set to be a2 (/Wh), an amount of third power is set to be M3 (Wh), a value thereof is set to be a3 (/Wh), an amount of fourth power is set to be M4 (Wh), and a value thereof is set to be a4 (/Wh).

* * * * *